(12) United States Patent
Kaplan et al.

(10) Patent No.: US 12,013,256 B1
(45) Date of Patent: Jun. 18, 2024

(54) DYNAMIC AUGMENTATION OF AUTONOMOUS VEHICLE MAP DATA USING PERCEIVED LANE ELEMENTS

(71) Applicant: Aurora Operations, Inc., Mountain View, CA (US)

(72) Inventors: Benjamin Kaplan, Denver, CO (US); Stephen O'Hara, Fort Collins, CO (US); Kevin Ullmann, Mountain View, CA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 0 days.

(21) Appl. No.: 18/241,884

(22) Filed: Sep. 3, 2023

(51) Int. Cl.
*G06V 20/56* (2022.01)
*G01C 21/00* (2006.01)

(52) U.S. Cl.
CPC ..... *G01C 21/3848* (2020.08); *G01C 21/3815* (2020.08); *G06V 20/588* (2022.01)

(58) Field of Classification Search
CPC .............. G06V 20/588; B60W 30/12; B60W 2552/53; G08G 1/167; G06T 2207/30256; G01C 21/3658; B60R 2300/804; B62D 15/0295
See application file for complete search history.

(56) References Cited

U.S. PATENT DOCUMENTS

| | | | |
|---|---|---|---|
| 2020/0209857 A1 | 7/2020 | Djuric et al. | |
| 2020/0393261 A1* | 12/2020 | Zhang | G08G 1/0133 |
| 2021/0383138 A1* | 12/2021 | Ma | B60W 40/04 |

* cited by examiner

*Primary Examiner* — Kenneth J Malkowski
(74) *Attorney, Agent, or Firm* — Gray Ice Higdon

(57) ABSTRACT

Discrepancies between mapped lanes on a roadway and perceived lanes perceived by the perception system of an autonomous vehicle may be identified and used to augment map data used by the autonomous vehicle, thereby enabling the autonomous vehicle to operate even in the event of the identified discrepancy.

20 Claims, 12 Drawing Sheets

DYNAMIC AUGMENTATION OF AUTONOMOUS VEHICLE MAP DATA USING PERCEIVED LANE ELEMENTS

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate map data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

A particular challenge, for example, results from the inherently dynamic environment within which autonomous vehicles are expected to operate. Many autonomous vehicles, for example, rely principally on high resolution (high quality) digital maps that represent the various static objects in an environment, e.g., including real word objects or elements such as roads, curbs, buildings, trees, signs, etc., as well as logical elements such as lanes, boundaries, etc., when generating trajectories to be followed. Other autonomous vehicles rely principally on perception systems (e.g., incorporating cameras, radar and/or LIDAR sensors) to sense their surroundings and generate trajectories accordingly, and generally with little or no reference to any digital map. Where high quality digital maps are used, attempts are generally made to maintain and update the maps to accommodate changes that occur in the environment; however, the overhead associated with verifying and distributing map data to a fleet of autonomous vehicles can be substantial. Furthermore, even with rapid updates, changes may nonetheless arise suddenly in an environment and not be reflected in the map data used by autonomous vehicles operating in the environment.

Moreover, while in some instances an autonomous vehicle's perception system may be used to detect changed circumstances in an environment (e.g., the presence of new construction elements such as traffic cones and/or barrels), the detection range of such a system is generally limited, and can be occluded as a result of the presence of other vehicles nearby, such that the amount of time that an autonomous vehicle may be given to react to some changed circumstances may be undesirably short. As such, a continuing need exists in the art for a manner of improving an autonomous vehicle's awareness of the relevant objects and elements in its environment.

It has been found, in particular, that construction areas can present challenges when generating autonomous vehicle trajectories, regardless of whether high quality digital maps are used. Even in non-constructions areas, various actual and logical boundaries may exist that constrain where an autonomous vehicle may travel, including, for example, painted or taped lines on the roadway; the physical edges of the roadway; and various physical barriers such as concrete barriers, guardrails, etc. In construction areas, these existing boundaries may be supplemented by additional boundaries such as repainted lines for temporary traffic diversions (which in some instances may overlap existing lines), spaced apart construction elements such as barrels or traffic cones that appear as distinct objects to the perception system, and construction elements such as jersey barriers that can be difficult to classify due to difficulties in determining object boundaries. Determining the correct lane of travel, as well as an appropriate trajectory that stays within that lane of travel, can therefore be challenging in a number of different scenarios, so a continuing need exists in the art for a manner of detecting, managing, and interpreting the various types of boundaries that an autonomous vehicle may encounter during operation.

SUMMARY

The present disclosure is related in part to the identification of discrepancies between mapped lanes on a roadway, which are generally represented in a stored map data for an environment and used by an autonomous vehicle during its operation, and perceived lanes, which are perceived by the perception system of the autonomous vehicle while the autonomous vehicle is operating within the environment. An identified discrepancy, for example, may be used to augment map data with a pathway that can be used to operate the autonomous vehicle in a perceived lane, thereby enabling the autonomous vehicle to operate even in the event of the identified discrepancy.

Therefore, consistent with one aspect of the invention, an autonomous vehicle control system for an autonomous vehicle may include one or more processors, and memory storing instructions that, when executed by the one or more processors, cause the autonomous vehicle control system to receive map data describing a mapped lane on a roadway in an environment within which the autonomous vehicle operates, receive perception data describing at least one perceived lane element for the roadway that is sensed by at least one perception sensor of the autonomous vehicle during operation of the autonomous vehicle on the roadway, detect a discrepancy between the mapped lane and a perceived lane on the roadway that is defined by the at least one perceived lane element, in response to detecting the discrepancy, augment the map data to generate augmented map data, where the augmented map data describes a pathway for use in operating the autonomous vehicle in the perceived lane, and control the autonomous vehicle using the augmented map data.

Also, in some embodiments, the pathway is an ego pathway within which the autonomous vehicle is operating, and the one or more processors are configured to control the autonomous vehicle using the augmented map data by controlling the autonomous vehicle to follow the ego pathway. Further, in some embodiments, the pathway is an adjacent pathway to an ego pathway within which the autonomous vehicle is operating.

Also, in some embodiments, the mapped lane is a first mapped lane for the roadway, the perceived lane is a first perceived lane for the roadway, and the pathway is a first pathway, the map data further describes a second mapped lane for the roadway, the one or more processors are further configured to detect a second discrepancy between the second mapped lane and a second perceived lane in the roadway that is defined by the at least one perceived lane element, and the augmented map data further describes a second pathway for use in operating the autonomous vehicle within the second perceived lane. In addition, in some embodiments, the one or more processors are further configured to, in response to the detected discrepancy, disable the mapped lane such that the mapped lane is ignored during generation of a trajectory for the autonomous vehicle.

Moreover, in some embodiments, the map data includes a pathway element defining the mapped lane, and the one or more processors are configured to disable the mapped lane in the augmented map data by omitting the pathway element from the augmented map data. In some embodiments, the one or more processors are configured to augment the map data to generate the augmented map data by identifying left and right boundaries of the pathway using the at least one perceived boundary. Further, in some embodiments, the pathway defines a left boundary and a right boundary of the pathway. In some embodiments, the pathway defines a centerline of the pathway.

Moreover, in some embodiments, the one or more processors are configured to detect the discrepancy between the mapped lane and the perceived lane by comparing at least one mapped lane element associated with the mapped lane with the at least one perceived lane element. Further, in some embodiments, the one or more processors are configured to compare the at least one mapped lane element with the at least one perceived lane element by comparing a mapped polyline or cubic spline for the at least one mapped lane element with a perceived polyline or cubic spline for the at least one perceived lane element to attempt to match the mapped lane with the perceived lane. In some embodiments, the one or more processors are configured to augment the map data only after detecting the discrepancy during multiple consecutive intervals. Also, in some embodiments, the one or more processors are further configured to generate the perceived lane from the at least one perceived lane element.

Moreover, in some embodiments, the one or more processors are further configured to generate a plurality of perceived boundaries for the roadway by processing sensor data received from the at least one perception sensor using a trained machine learning model that integrates detection of perceived boundaries associated with a plurality of semantic boundary types for the roadway. In addition, in some embodiments, the plurality of perceived boundaries includes a first perceived boundary associated with a virtual construction semantic boundary type of the plurality of semantic boundary types and second perceived boundary associated with an additional semantic boundary type of the plurality of semantic boundary types, and the additional semantic boundary type for the second perceived boundary is a physical barrier semantic boundary type, a painted lane semantic boundary type, or a road edge semantic boundary type. Also, in some embodiments, the trained machine learning model further integrates detection of sidedness attributes for at least a subset of the plurality of perceived boundaries, and the one or more processors are configured to augment the map data to generate the augmented map data using a sidedness attribute of the at least one perceived boundary.

In some embodiments, the augmented map data is accessible by a downstream component of the autonomous vehicle control system using an Application Programming Interface (API) that is generic to augmented and un-augmented map data. In addition, in some embodiments, the at least one perceived lane element is a boundary-type lane element or a pathway-type lane element. Also, in some embodiments, the one or more processors are configured to augment the map data to generate augmented map data by adding new map data, modifying at least a portion of the map data and/or deleting at least a portion of the map data.

Consistent with another aspect of the invention, a method of operating an autonomous vehicle may include receiving map data describing a mapped lane on a roadway in an environment within which the autonomous vehicle operates, receiving perception data describing at least one perceived lane element for the roadway that is sensed by at least one perception sensor of the autonomous vehicle during operation of the autonomous vehicle on the roadway, detecting a discrepancy between the mapped lane and a perceived lane on the roadway that is defined by the at least one perceived lane element, in response to detecting the discrepancy, augmenting the map data to generate augmented map data, where the augmented map data describes a pathway for use in operating the autonomous vehicle in the perceived lane, and controlling the autonomous vehicle using the augmented map data.

Consistent with another aspect of the invention, a non-transitory computer readable storage medium may store computer instructions executable by one or more processors to perform a method of operating an autonomous vehicle. The method may include receiving map data describing a mapped lane on a roadway in an environment within which the autonomous vehicle operates, receiving perception data describing at least one perceived lane element for the roadway that is sensed by at least one perception sensor of the autonomous vehicle during operation of the autonomous vehicle on the roadway, detecting a discrepancy between the mapped lane and a perceived lane on the roadway that is defined by the at least one perceived lane element, in response to detecting the discrepancy, augmenting the map data to generate augmented map data, where the augmented map data describes a pathway for use in operating the autonomous vehicle in the perceived lane, and controlling the autonomous vehicle using the augmented map data.

Some implementations may also include an autonomous vehicle and/or a system that is remotely located from an autonomous vehicle and includes one or more processors that are configured to perform various of the operations described above. Some implementations may also include an autonomous vehicle control system including one or more processors, a computer readable storage medium, and computer instructions resident in the computer readable storage medium and executable by the one or more processors to perform various of the methods described above. Still other implementations may include a non-transitory computer readable storage medium that stores computer instructions executable by one or more processors to perform various of the methods described above. Yet other implementations may include a method of operating any of the autonomous vehicles, autonomous vehicle control systems described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The various implementations discussed hereinafter are generally directed in part to identifying discrepancies between mapped and perceived lanes in a roadway, and the use of such identified discrepancies to augment the map data used by an autonomous vehicle to operate on the roadway. Prior to a discussion of these implementations, however, an example hardware and software environment within which the various techniques disclosed herein may be implemented will be discussed.

Hardware and Software Environment

Figure 1:
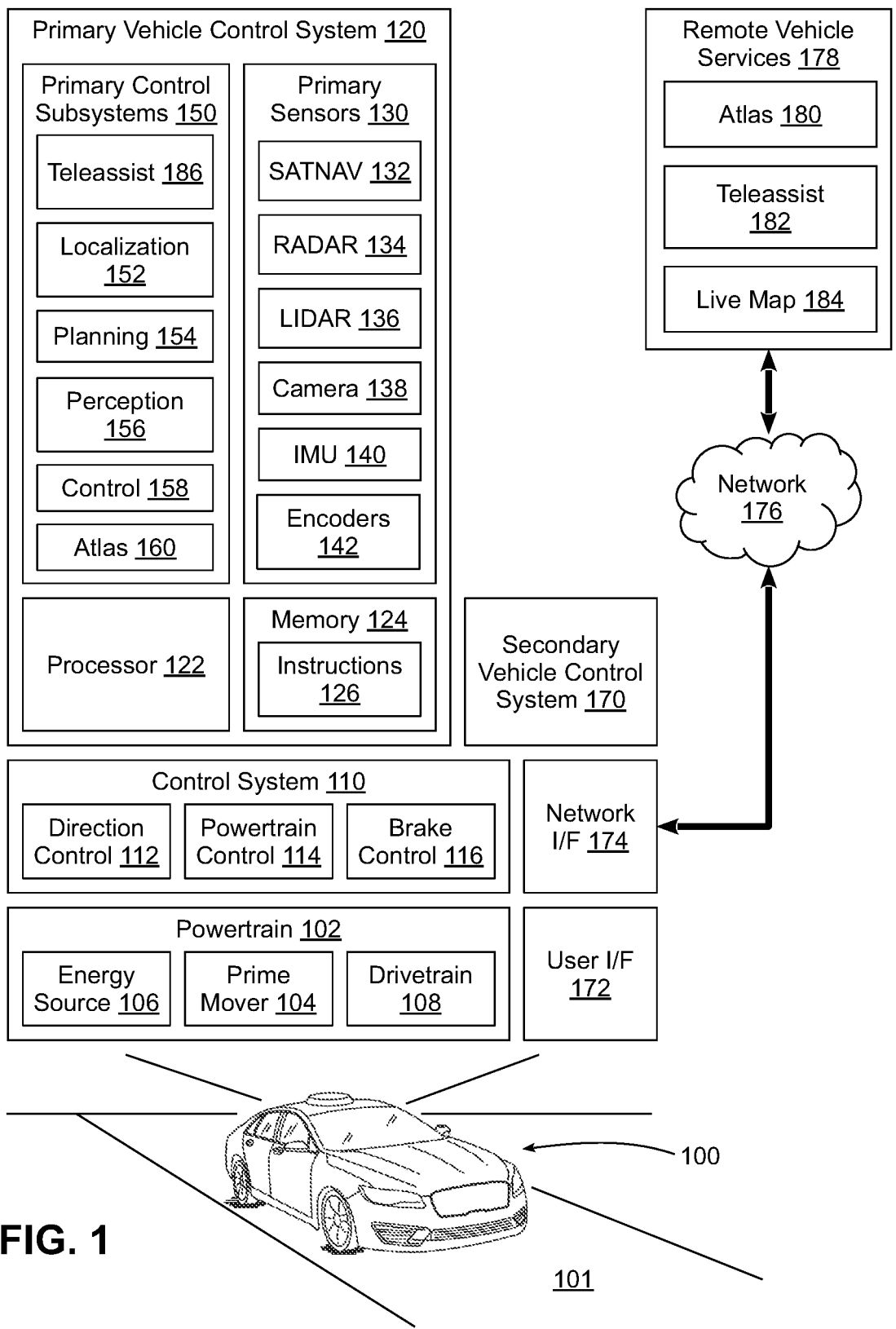
FIG. 1 illustrates an example hardware and software environment for an autonomous vehicle.

Turning to the Drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114 and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134, 136, as well as one or more digital cameras 138 (which may include various types of image capture devices capable of capturing still and/or video imagery), may be used to sense stationary and moving objects within the immediate vicinity of a vehicle. An inertial measurement unit (IMU) 140 may include multiple gyroscopes and accelerometers capable of detection linear and rotational motion of a vehicle in three directions, while one or more wheel encoders 142 may be used to monitor the rotation of one or more wheels of vehicle 100.

The outputs of sensors 132-142 may be provided to a set of primary control subsystems 150, including, a localization subsystem 152, a planning subsystem 154, a perception subsystem 156, and a control subsystem 158. Localization subsystem 152 is principally responsible for precisely determining the location and orientation (also sometimes referred to as "pose", which in some instances may also include one or more velocities and/or accelerations) of vehicle 100 within its surrounding environment, and generally within some frame of reference. Planning subsystem 154 is principally responsible for planning a trajectory or path of motion for vehicle 100 over some timeframe given a desired destination as well as the static and moving objects within the environment, while perception subsystem 156 is principally responsible for detecting, tracking and/or identifying elements within the environment surrounding vehicle 100. Control subsystem 158 is principally responsible for generating suitable control signals for controlling the various controls in control system 110 in order to implement the planned trajectory or path of the vehicle. Any or all of localization subsystem 152, planning subsystem 154, perception subsystem 156, and control subsystem 158 may have associated data that is generated and/or utilized in connection with the operation thereof, and that which may be communicated to a teleassist system in some implementations.

In addition, an atlas or map subsystem 160 may be provided in the illustrated implementations to describe the elements within an environment and the relationships therebetween. Atlas subsystem 160 may be accessed by each of the localization, planning and perception subsystems 152-156 to obtain various information about the environment for use in performing their respective functions. Atlas subsystem 160 may be used to provide map data to the autonomous vehicle control system, which may be used for various purposes in an autonomous vehicle, including for localization, planning, and perception, among other purposes. Map data may be used, for example, to lay out or place elements within a particular geographical area, including, for example, elements that represent real world objects such as roadways, boundaries (e.g., barriers, lane dividers, medians, etc.), buildings, traffic devices (e.g., traffic or road signs, lights, etc.), as well as elements that are more logical or virtual in nature, e.g., elements that represent valid pathways a vehicle may take within an environment, "virtual" boundaries such as lane markings, or elements that represent logical collections or sets of other elements. Map data may also include data that characterizes or otherwise describes elements in an environment (e.g., data describing the geometry, dimensions, shape, etc. of objects), or data that describes the type, function, operation, purpose, etc., of elements in an environment (e.g., speed limits, lane restrictions, traffic device operations or logic, etc.). In some implementations, atlas subsystem 160 may provide map data in a format in which the positions of at least some of the elements in a geographical area are defined principally based upon relative positioning between elements rather than any absolute positioning within a global coordinate system. It will be appreciated, however, that other atlas or map systems suitable for maintaining map data for use by autonomous vehicles may be used in other implementations, including systems based upon absolute positioning. Furthermore, it will be appreciated that at least some of the map data that is generated and/or utilized by atlas subsystem 160 may be communicated to a teleassist system in some implementations.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating autonomous vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 172 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which vehicle 100 receives environmental and other data for use in autonomous control thereof. In the illustrated implementations, for example, vehicle 100 may be in communication with various cloud-based remote vehicle services 178 including, at least for the purposes of implementing various functions described herein, an atlas or map service or system 180, a teleassist service or system 182, and a live map service or system 184. Atlas or map service or system 180 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Teleassist service or system 182 may be used, for example, to provide teleassist support to vehicle 100, e.g., through communication with a teleassist subsystem 186 resident in primary vehicle control system 120, as will be discussed in greater detail below. Live map service or system 184 may be used to propagate various observations collected by one or more autonomous vehicles to effectively supplement the global repository maintained by atlas or map service or system 180. The terms "service" and "system" are generally used interchangeably herein, and generally refer to any computer functionality capable of receiving data from, and providing data to, an autonomous vehicle. In many instances, these services or systems may be considered to be remote services or systems insofar as they are generally external to an autonomous vehicle and in communication therewith.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module, machine learning model, or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Unified Boundary Machine Learning Model For Autonomous Vehicles

In operation, autonomous vehicles may encounter various types of actual and logical boundaries on a roadway that constrain where the autonomous vehicle may travel and/or delineate acceptable lanes within which travel is permitted. Some boundaries may be physical in nature, including, for example, the physical edges of a roadway and/or various physical barriers along a roadway, including, for example, concrete barriers, guardrails, etc. that actually constrain where an autonomous vehicle may travel. In addition, some boundaries may not physically constrain a vehicle but may nonetheless logically delineate the acceptable lanes within which travel is permitted, e.g., painted or taped lines on the road surface the define the extent of each lane of travel, as well as delineate shoulders, exits, entrances, etc. Such logical boundaries may also present differing semantic constraints, e.g., dashed lines that separate adjacent same-direction lanes or that allow for passing, double solid lines that restrict lane changes or passing, etc.

In construction areas, these existing boundaries may also be supplemented by additional boundaries such as repainted or taped lines for temporary traffic diversions (which in some instances may overlap existing lines), spaced apart construction elements such as barrels or traffic cones that appear as distinct objects to the perception system, and construction elements such as jersey barriers that can be difficult to classify due to difficulties in determining object boundaries. Determining the correct lane of travel, as well as an appropriate trajectory that stays within that lane of travel, can therefore be challenging in a number of different scenarios, so a continuing need exists in the art for a manner of detecting and managing the various types of boundaries that an autonomous vehicle may encounter during operation.

One potential approach for addressing the various types of boundaries that an autonomous vehicle might encounter is to use multiple components incorporating engineered/heuristic algorithms and/or trained machine learning models to detect different types of boundaries. Boundaries defined by spaced apart construction elements such as traffic cones or barrels, for example, may be determined using a component that is downstream of a perception component, and in some instances, downstream of a tracking component, and that generates "virtual" boundaries in response to detection by a perception component of multiple construction elements that are found to be within predetermined arrangements relative to one another. Lane boundaries defined by painted or taped lines on the surface of the road may be detected in connection with localization in order to improve the determined global pose of a vehicle by aligning the vehicle within a lane. Physical barriers may be sensed by a perception system and used in connection with object avoidance.

It has been found, however, that detecting various types of boundaries in different components and for different purposes can raise various issues, particularly in construction areas where physical barriers, temporarily lane markers, traffic cones, barrels, etc. are present, and where vehicles may be diverted into other lanes or paths that differ from the lanes defined in map data. For example, determinations of virtual boundaries associated with spaced apart construction elements may benefit from the use of map data to determine how construction elements are aligned relative to the roadway, and further could benefit from the detection of temporary lane markers in such an alignment. When implemented in separate components, however, dependencies may be created, requiring multiple passes and increased system latency.

In the illustrated implementations, however, a unified boundary machine learning model may be trained and used to detect multiple types of boundaries in response to perception data collected from one or more perception sensors, e.g., one or more cameras/image sensors and/or LIDAR sensors. Moreover, in some instances, a unified boundary machine learning model may be incorporated into a multi-head machine learning model that also supports mainline perception, providing reduced system-level computation and memory usage, as well as joint optimization of both functions as well as optimization of contextual interactions between different boundary types.

Figure 2:
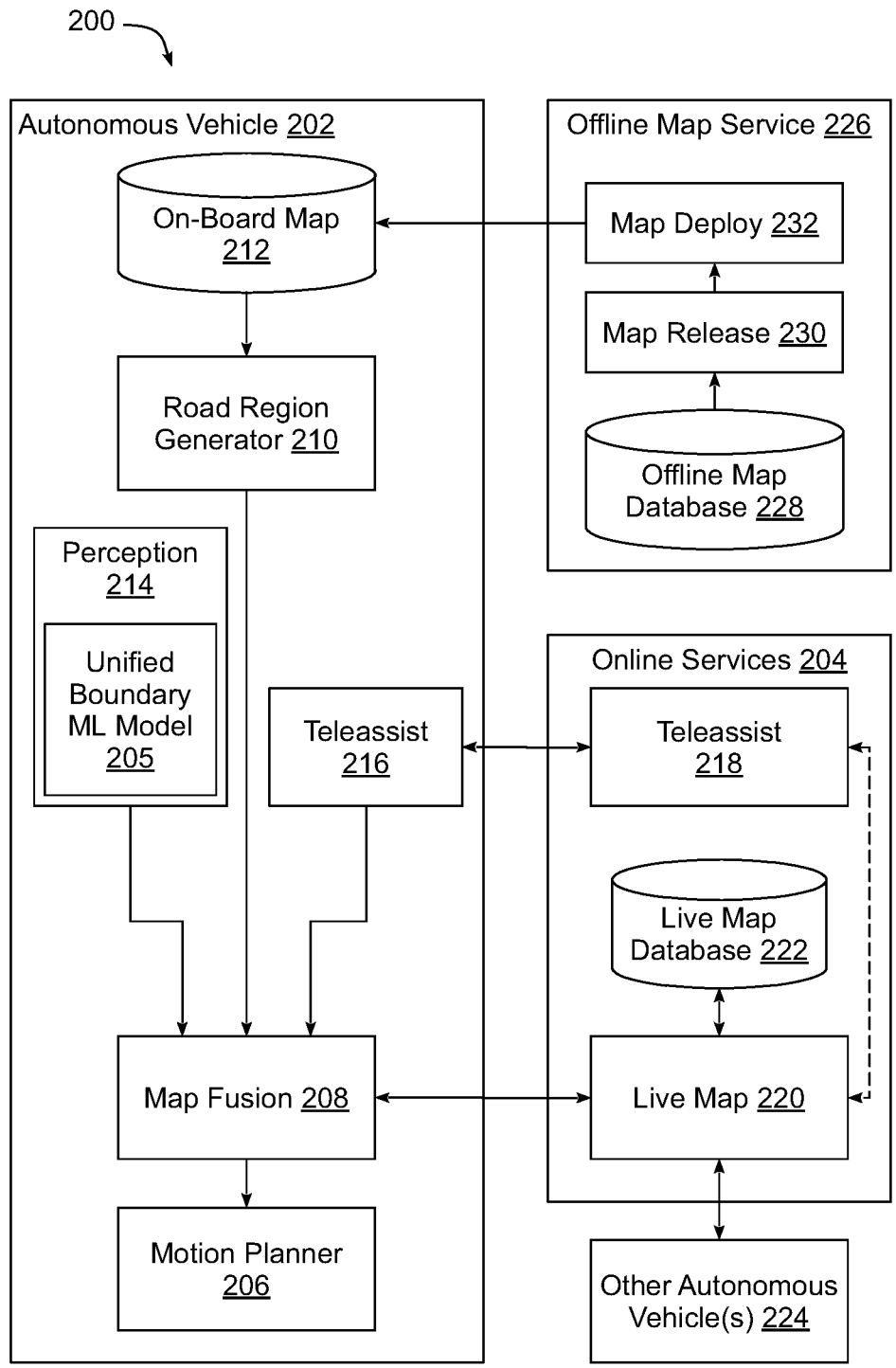
FIG. 2 is a block diagram illustrating a system for controlling an autonomous vehicle, and utilizing a unified boundary machine learning model consistent with some implementations.

FIG. 2, for example, illustrates an example system 200 incorporating an autonomous vehicle 202 in communication with a set of online services 204, and supporting a perception-based unified boundary machine learning model 205 consistent with some implementations. System 200 also supports both live map and teleassist functionality; however, in other implementations, one or both of live map functionality and teleassist functionality may be omitted.

Within autonomous vehicle 202, a motion planner component 206 receives data, e.g., an augmented road region layout, from a map fusion component 208. Map fusion component 208 may receive a digital map, e.g., a road region layout, from a road region generator component 210. Component 210 may generate a road region layout by accessing an on-board map 212 to retrieve offline map data suitable for generating a digital map of the environment surrounding autonomous vehicle 202 during operation. Map fusion component 208 may also receive observation data from a perception component 214, which collects observations using one or more sensors in the manner discussed above, and which in the illustrated implementation utilizes unified boundary machine learning model 205. A perception component in some implementations may also provide tracks for various dynamic objects directly to motion planner component 206. Where teleassist support is provided, map fusion component 208 may also receive teleassist data, e.g., teleassist operator input, from a teleassist component 216 that is in communication with a remote teleassist system 218. Furthermore, in some implementations, map fusion component 208 may also receive additional observation data from a live map system 220, such that the data collected from components 210, 214, 216 and 220 may be fused into the augmented road region layout used by motion planner component 206 when generating a trajectory or path of motion for the autonomous vehicle.

The observation data provided by live map system 220 is stored in a live map database or data store 222, and includes observation data collected from one or more other autonomous vehicles 224. Live map system 220 is generally in bi-directional communication with both autonomous vehicle 202 and other autonomous vehicle(s) 224 to both collect observation data for autonomous vehicles 202, 224 and to propagate observation data collected by autonomous vehicles 202, 224 operating in a particular portion or region of the environment to other autonomous vehicles 202, 224 operating in the same portion or region of the environment. In addition, teleassist system 218 may also be in bi-directional communication with live map database 222 via live map system 220 to enable a teleassist operator to store teleassist data, e.g., location-based teleassist triggers, to be propagated to autonomous vehicles via live map system 202, as well as to retrieve observation data from live map database 222 in connection with conducting a teleassist session with autonomous vehicle 202. Teleassist system 218 may also be in bi-directional communication with autonomous vehicle 202 in some implementations (e.g., via teleassist component 216) to allow an autonomous vehicle to provide situational awareness data to a teleassist operator and to allow the teleassist operator to provide suggesting actions to the autonomous vehicle. In some implementations, no direct link may be present between teleassist system 218 and live map system 220, such that communication between these components may be handled through map fusion component 208 and teleassist component 216.

Live map system 220 and live map database 222 are representative of an online map system that propagates observation data within an autonomous vehicle fleet, as opposed to an offline map service 226, e.g., an atlas system or service, that provides offline map data to the autonomous vehicle fleet. An offline map service 226, for example, may include an offline map database 228 that maintains a global repository of offline map data. A map release component 230 may be used to generate versioned updates of the offline map database, and a map deploy component 232 may be used to deploy or propagate the database updates to an autonomous vehicle fleet. It will be appreciated that a global repository of offline map data may be substantial in size, so in some implementations only a portion of the offline map data corresponding to the particular area (e.g., a city, a state, a county, etc. within which autonomous vehicle 202 operates) may be deployed to the autonomous vehicle and maintained in its on-board map 212. In addition, based upon movement of the autonomous vehicle into adjacent areas, additional portions of the offline map data may be communicated to the autonomous vehicle by service 226 such that the on-board map 212 includes sufficient offline map data to operate the autonomous vehicle at its current location.

Figure 3:
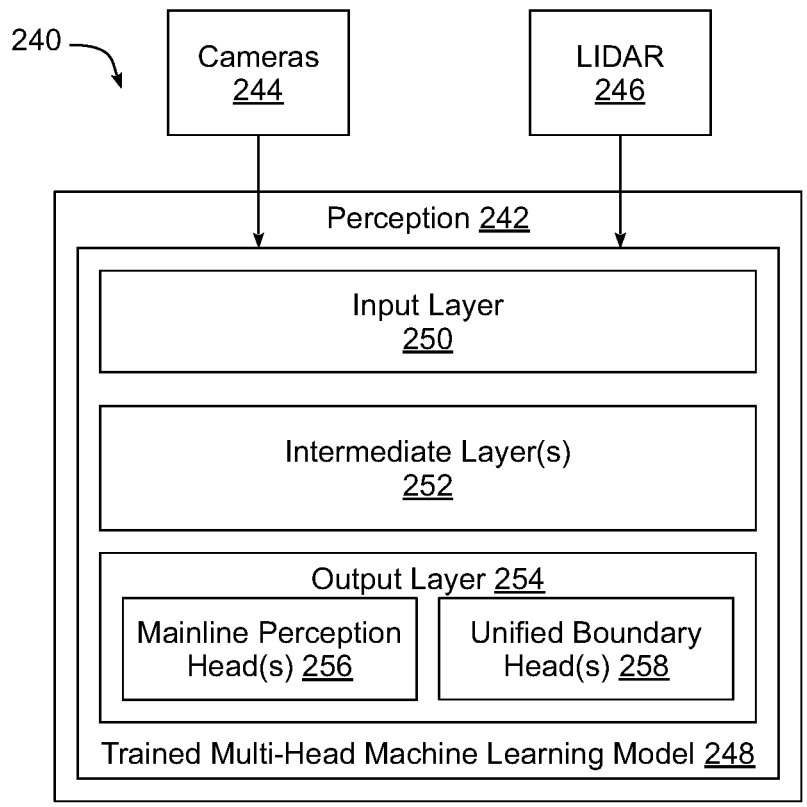
FIG. 3 is a block diagram illustrating an example perception system incorporating a unified boundary machine learning model consistent with some implementations.

FIG. 3 next illustrates one example manner of implementing trained unified boundary machine learning model 205 of FIG. 2. FIG. 3, in particular, illustrates an example autonomous vehicle control system 240 including a perception component 242 that receives as input perception data, e.g., as captured by one or more cameras or image sensors 244 (e.g., a camera with a forward-facing field of view) and LIDAR data, e.g., as captured by one or more LIDAR sensors 246. Each of image sensor 244 and LIDAR sensor 246 may be positioned on an autonomous vehicle to sense the roadway upon which the autonomous vehicle is disposed.

Perception component 242 includes a trained unified boundary machine learning model, in particular a trained multi-head machine learning model 248, that is configured to, in part, generate a plurality of perceived boundaries for the roadway. Model 248 in particular integrates detection of perceived boundaries associated with a plurality of semantic boundary types for the roadway. A semantic boundary type, within the context of the disclosure, may be considered to refer to a particular classification of boundary within a schema of detectable boundary types. Boundary types in some implementations may be classified based upon whether they are physical or virtual (i.e., whether or not they represent a continuous physical barrier constraining autonomous vehicle movement), whether they are actual or logical (i.e., whether they represent actual physical objects in the environment that an autonomous vehicle should avoid or they represent a logical construct that, for example, for legal or regulatory reasons, they are required to obey), and/or based upon other classifications. For example, a physical barrier such as a guardrail, jersey barrier or permanent concrete barrier may be associated with a physical barrier semantic boundary type, and a painted or taped line on the surface of the roadway that forms the boundary of a lane may be associated with a painted lane semantic boundary type. Likewise, a road edge, e.g., at the boundary between the road and a curb, median, a gravel shoulder, or other non-drivable surface that delineates the edge of the drivable area of a roadway may be associated with a road edge semantic boundary type.

Still other boundary type classifications may be based, for example, upon whether they are permanent or temporary/construction in nature, and in some instances, boundary types may be classified with finer granularity, e.g., to distinguish between guardrails and concrete barriers, between different types of road edges, between different types of painted lane boundaries (e.g., yellow vs. white, single dashed, single solid, double solid, solid and dashed), etc.

In addition, in some implementations, a unified boundary machine learning model such as trained multi-head machine learning model 248 may also be trained to detect pathways of the autonomous vehicle (the "ego" vehicle) and/or the pathways of other vehicles in the vicinity of the autonomous vehicle. These pathways may also be used in the control of an autonomous vehicle, as the path that a vehicle takes may be indicative of the locations of the drivable lanes on the roadway. In some implementations, pathways may be defined in a similar manner to boundaries, e.g., as collections of linear or curvilinear segments, but with the segments representing a centerline of a path taken by the ego or another vehicle.

In some implementations, boundaries and pathways may collectively be referred to as lane elements, as each may be capable of defining some aspect of a lane in a roadway. A lane, in this regard, may be considered to be a region of a roadway within which a vehicle may potentially be able to operate. A lane element, in turn, may be used to define some aspect of the lane, e.g., a virtual or physical boundary, a centerline, etc. A boundary-type lane element, for example, may define a boundary associated with the lane, while a pathway-type lane element may define a pathway through the lane (e.g., a centerline of the lane). It will be appreciated that a boundary may be represented by a single boundary-type lane element in some implementations, while in other implementations, a boundary may be represented by a collection of boundary-type lane elements defining portions or segments of the boundary. Likewise, a pathway may be represented by a single pathway-type lane element in some implementations, while in other implementations, a pathway may be represented by a collection of pathway-type lane elements defining portions or segments of the pathway.

It should be appreciated, however, that an individual lane element in some implementations may not necessarily be associated with a complete, drivable lane on a roadway, and a lane need not be defined fully by lane elements associated with left and right boundaries and a centerline. Particularly in construction areas, various construction-related boundaries may exist that effectively supersede other detected boundaries such that those other detected boundaries could not be used to define a complete, drivable lane on the roadway due to the presence of other detected lane elements. In addition, in some construction scenarios, vehicles on the roadway may follow different paths than those represented by the detected boundaries, so the pathways defined by those vehicles may, in some instances, define lanes without perceptible boundaries, or lanes that appear to cross or overlap with other lanes defined by the boundaries on the roadway.

At least one of the semantic boundary types supported by a unified boundary machine learning model such as trained multi-head machine learning model 248 includes a virtual construction semantic boundary type that is associated with a plurality of spaced apart construction elements such as traffic cones or barrels that, while not physical forming a continuous barrier due to the gaps between the elements, nonetheless define a virtual boundary that should be obeyed as a constraint on autonomous vehicle movement. Such construction elements may be separately detectable by the perception system due to the spacing, so a trained unified boundary machine learning model in some implementations may detect and link together these multiple construction elements into a virtual boundary based upon the presence of such construction elements having a spacing and arrangement that defines a suitable boundary along the roadway to constrain vehicle movement. In addition, in some implementations, even though the spaced construction elements are linked together to define a virtual boundary, the mainline perception system may still detect the individual spaced construction elements and output those elements to a tracking component to generate tracks for the construction elements such that the autonomous vehicle is controlled using both the virtual boundary defined for the spaced construction elements as well as the tracks for such construction elements.

In some implementations, for example, trained multi-head machine learning model 248 may be implemented as a deep neural network (DNN) including an input layer 250, one or more intermediate layers 252, and an output layer 254 including one or more mainline perception heads 256 and one or more unified boundary heads 258. In some implementations, for example, one or more intermediate layers 252 may include one or more convolutional layers. The dimensions/shape of input layer 250 may be dependent on the shape of the perception data to be applied, while the dimensions/shape of each output head 256, 258 may be dependent on various factors such as how many class probabilities are to be predicted, among others. In some implementations, multiple convolution layers may be provided, and max pooling and/or other layers such as affine layers, softmax layers and/or fully connected layers may optionally be interposed between one or more of the convolution layers and/or between a convolution layer and the output layer. Other implementations may not include any convolution layer and/or not include any max pooling layers, and in still other implementations, other machine learning models may be used, e.g., Bayesian models, random forest models, Markov models, etc.

Figure 4:
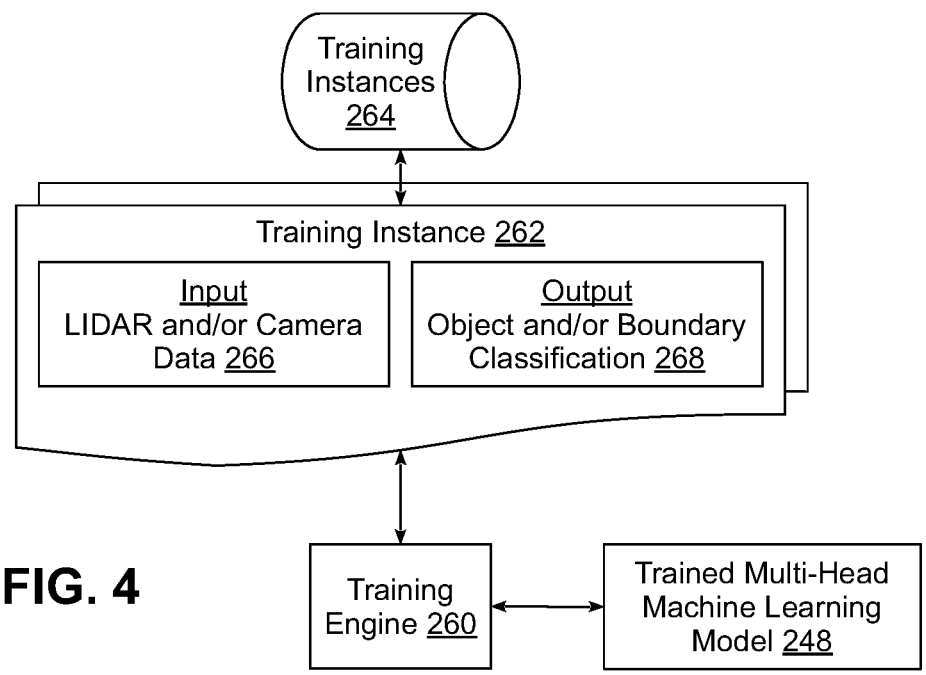
FIG. 4 is a block diagram illustrating a training system for training the unified boundary machine learning model of FIG. 3.

FIG. 4 illustrates a system for training model 248, e.g., using a training engine 260 that utilizes training instances 262 retrieved from a training instances database 264. The input 266 of each training instance, for example, may include perception data such as LIDAR and/or camera/image data, and the output 268 of each training instance may include object and/or boundary classifications. In some implementations, for example, the training instance output 268 may define, for each of a plurality of spatial regions, whether an object of one or more classes is present in the spatial region and/or whether a boundary of one or more classes is present in the spatial region. In training model 248, training engine 260 may apply the training instance input 266 to model 248 and process the training instance input 266, utilizing model 248 and based on current parameters of model 248, to generate an output having a dimension that conforms to the dimension of training instance output 268. Training engine 260 may then compare the generated output to the training instance output 268, and update one or more parameters of model 248 based on the comparison. For example, training engine 260 may generate an error based on differences between the generated output and the training instance output 268, and backpropagate a loss (that is based on the error) over model 248 to update model 248. Although only a single training instance 262 is illustrated in FIG. 4, model 248 will generally be trained based on a large quantity of training instances of training instances database 264. Those training instances can collectively include training instance inputs with diverse perception data and diverse training instance outputs. Moreover, although non-batch training is described with respect to FIG. 4, batch training may additionally or alternatively be utilized (e.g., where losses are based on errors determined based on a batch of training instances).

As model 248 is a multi-head model that incorporates at least one mainline perception head 256 and at least one unified boundary head 258, different subsets of training instances may be used, thereby co-training the different output heads 256, 258 and jointly optimizing the model for both mainline perception and unified boundary perception functionality. At least one subset of the training instances may include input perception data associated with one or more objects sensed within the environment and output classification data that classifies one or more objects to be classified by the least one mainline perception head. At least one subset of the training instances includes input perception data associated with one or more perceived boundaries associated with a virtual construction semantic boundary type for one or more roadways within the environment and output classification data that classifies the one or more perceived boundaries associated with the virtual construction semantic boundary type. In addition, at least one subset of the training instances includes input perception data associated with one or more perceived boundaries associated with an additional semantic boundary type for one or more roadways within the environment and output classification data that classifies the one or more perceived boundaries associated with the additional semantic boundary type. Furthermore, it will be appreciated that at least one training instance may be overlapping in nature, and may include perception data associated with multiple objects and/or multiple boundaries associated with multiple semantic boundary types, thereby further jointly optimizing the model for both mainline perception and unified boundary functionality.

Figure 5:
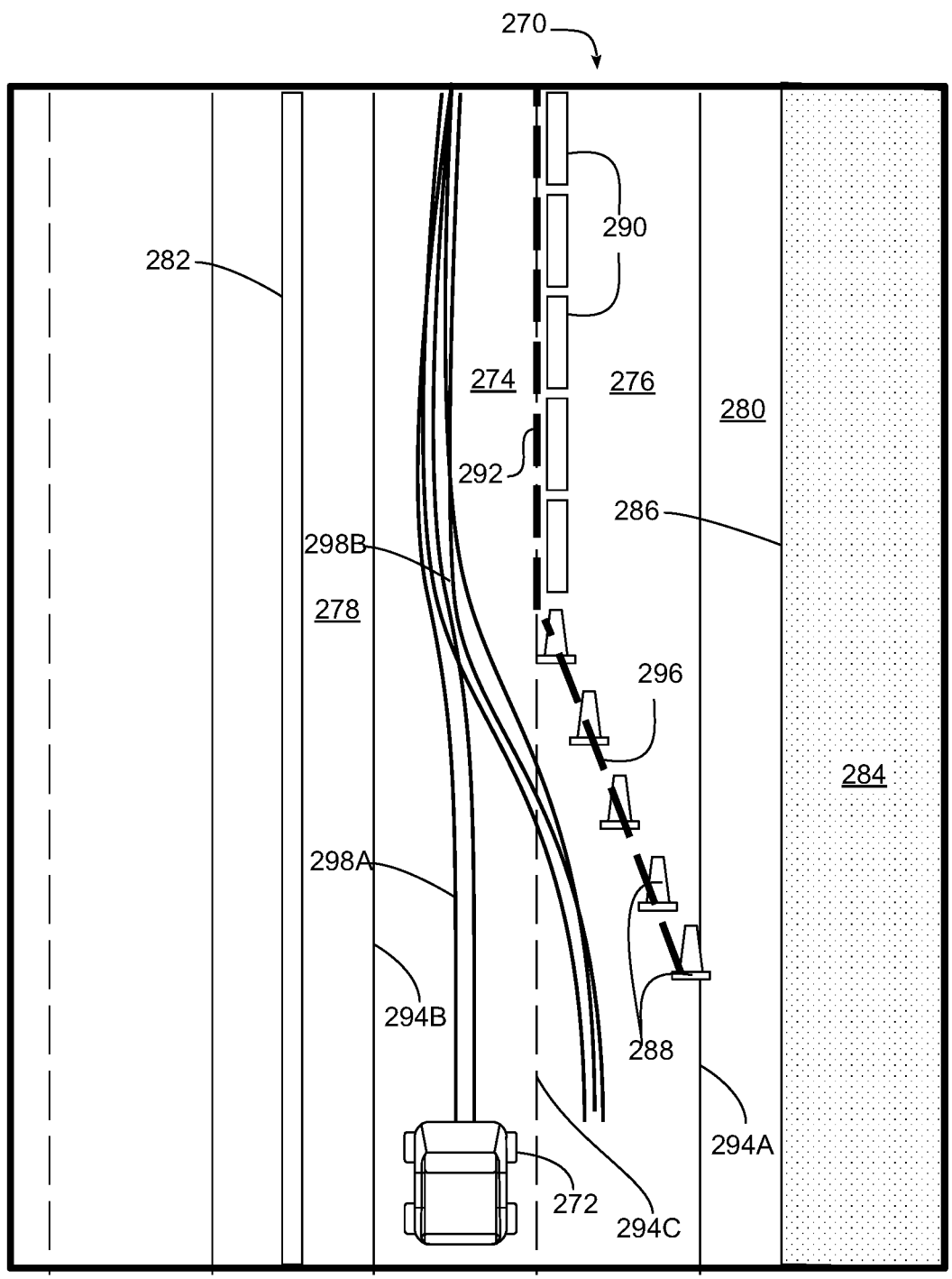
FIG. 5 illustrates an example roadway incorporating various types of boundaries capable of being encountered by an autonomous vehicle.

FIG. 5 illustrates an example roadway 270 to further describe various semantic boundary types that may be supported in a unified boundary machine learning model in some implementations. An autonomous vehicle 272, for example, is illustrated as traveling on a four-lane divided roadway 270 including a pair of same-direction lanes 274, 276 separated by shoulders 278, 280 from a permanent concrete median barrier 282 and a non-road (e.g., grass) area 284. A road edge 286 separates shoulder 280 from non-road area 284, and in the example illustration, a construction area is defined by a plurality of spaced apart construction elements 288 (here, traffic cones) that effectively close lane 276 and divert all traffic into lane 274, followed by a plurality of jersey barriers 290 that separate lanes 274 and 276.

Within this example roadway, a number of different perceived boundaries, each having a one of a plurality of different semantic boundary types, may be generated and used in the control of an autonomous vehicle.

For example, one semantic boundary type that may be supported in some implementations is a physical barrier semantic boundary type, and two perceived boundaries with such a semantic boundary type are represented by permanent concrete median barrier 282 and boundary 292 that is defined by jersey barriers 290. Another semantic boundary type that may be supported in some implementations is a road edge semantic boundary type, and a perceived boundary with such a semantic boundary type is represented by road edge 286 defined between shoulder 280 and non-road area 284.

Yet another semantic boundary type that may be supported in some implementations is a painted lane semantic boundary type, and three perceived boundaries with such a semantic boundary type are represented by solid painted lines 294A and 294B and dashed painted line 294C. Another semantic boundary type that may be supported in some implementations is a virtual construction semantic boundary type, and a boundary with such a semantic boundary type is represented by boundary 296 defined by traffic cones 288.

In addition, as further illustrated in FIG. 5, some implementations may also support detection of pathways within a trained unified boundary machine learning model, and a number of perceived pathways are illustrated, e.g., at 298A and 298B. Perceived pathway 298A, for example, may represent an ego path of autonomous vehicle 272, while perceived pathway 298B may represent a path of another vehicle sensed by the perception system.

Figure 6:
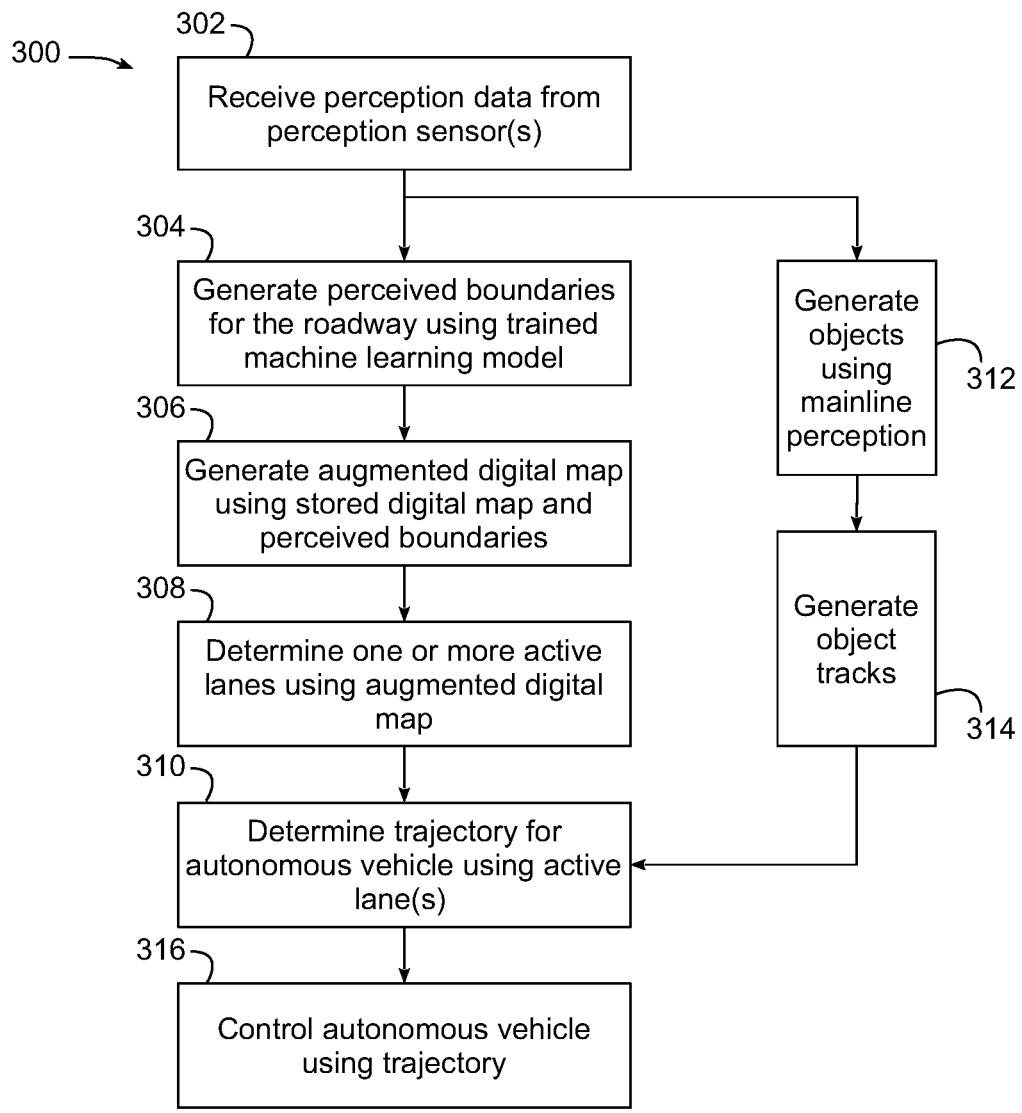
FIG. 6 is a flowchart illustrating an example operational sequence for controlling an autonomous vehicle using a unified boundary machine learning model consistent with some implementations.

Now turning to FIG. 6, an example operational sequence 300 for controlling an autonomous vehicle (e.g., autonomous vehicle 202 of FIG. 2) using a trained unified boundary model is illustrated. In block 302, perception data associated with a roadway upon which an autonomous vehicle is disposed is received from one or more perception sensors (e.g., in a perception component), and in block 304, one or more perceived boundaries are generated for the roadway using a trained unified boundary machine learning model as described above. In block 306 an augmented digital map is then generated using a stored digital map and the generated perceived boundaries (e.g., in a map fusion component). In addition, in this implementation, one or more active lanes in the roadway are determined using the augmented digital map in block 308, and a trajectory for the autonomous vehicle is determined using the active lane(s) in block 310, both of which may be performed, for example, in a motion planner component. The one or more active lanes may be identified as an ego lane (i.e., a lane in which the autonomous vehicle is or should be operating) or an adjacent lane.

In addition, in some implementations, the motion planner component may also optionally utilize one or more object tracks in order to determine the trajectory for the autonomous vehicle. For example, in block 312, one or more objects may be generated using mainline perception, e.g., in a trained mainline perception machine learning model, which in some implementations may be integrated with the trained unified boundary machine learning model into a multi-head machine learning model such as model 248 of FIG. 3. Then, in block 314 a tracking component may generate tracks for the generated objects such that the determination of the trajectory in block 310 also uses the generated object tracks. The autonomous vehicle is then controlled in block 316 using the determined trajectory.

As noted above, in operational sequence 300, one or more active lanes may be determined or synthesized by the map fusion component in block 308. In the illustrated implementation, the determination of the active lanes may be based in part on an interpretation of all of the perceived boundaries generated by the trained unified boundary machine learning model in the map fusion component. Thus, the map fusion component may be configured to assess each of the boundaries, in some instances in connection with the digital map, to interpret each boundary and determine therefrom one or more active lanes within which the autonomous vehicle is permitted to drive. In the roadway of FIG. 5, for example, an interpretation of the perceived boundaries in connection with the digital map would result in some implementations in a determination that lane 274 is active and lane 276 is inactive, as well as that the drivable area available to the autonomous vehicle is, on one side, bounded by painted line 294B, and on the other side, bounded first by painted line 294A, then by virtual construction boundary 296 defined by construction elements 288, and then by boundary 292 defined by jersey barriers 290. In addition, the motion planner component could also interpret pathways 298A, 298B, etc. to select an appropriate trajectory that directs the autonomous vehicle within the active lane.

In other implementations, however, determination of an active lane and/or a drivable area for an autonomous vehicle may be based in part on the interpretation of boundaries upstream of the motion planner component. In some implementations, for example, a unified boundary machine learning model may be trained to also interpret perceived boundaries. As such, rather than generating an augmented digital map using the generated perceived boundaries in a map fusion component, and determining one or more active lanes in the roadway using the augmented digital map in a motion planner component (as is the case with blocks 306 and 308), a trained unified boundary machine learning model may also interpret the perceived boundaries to generate one or more active lanes, such that active lanes (and in some instances, the perceived boundaries as well) may be used to augment a digital map (e.g., in a map fusion component).

Figure 7:
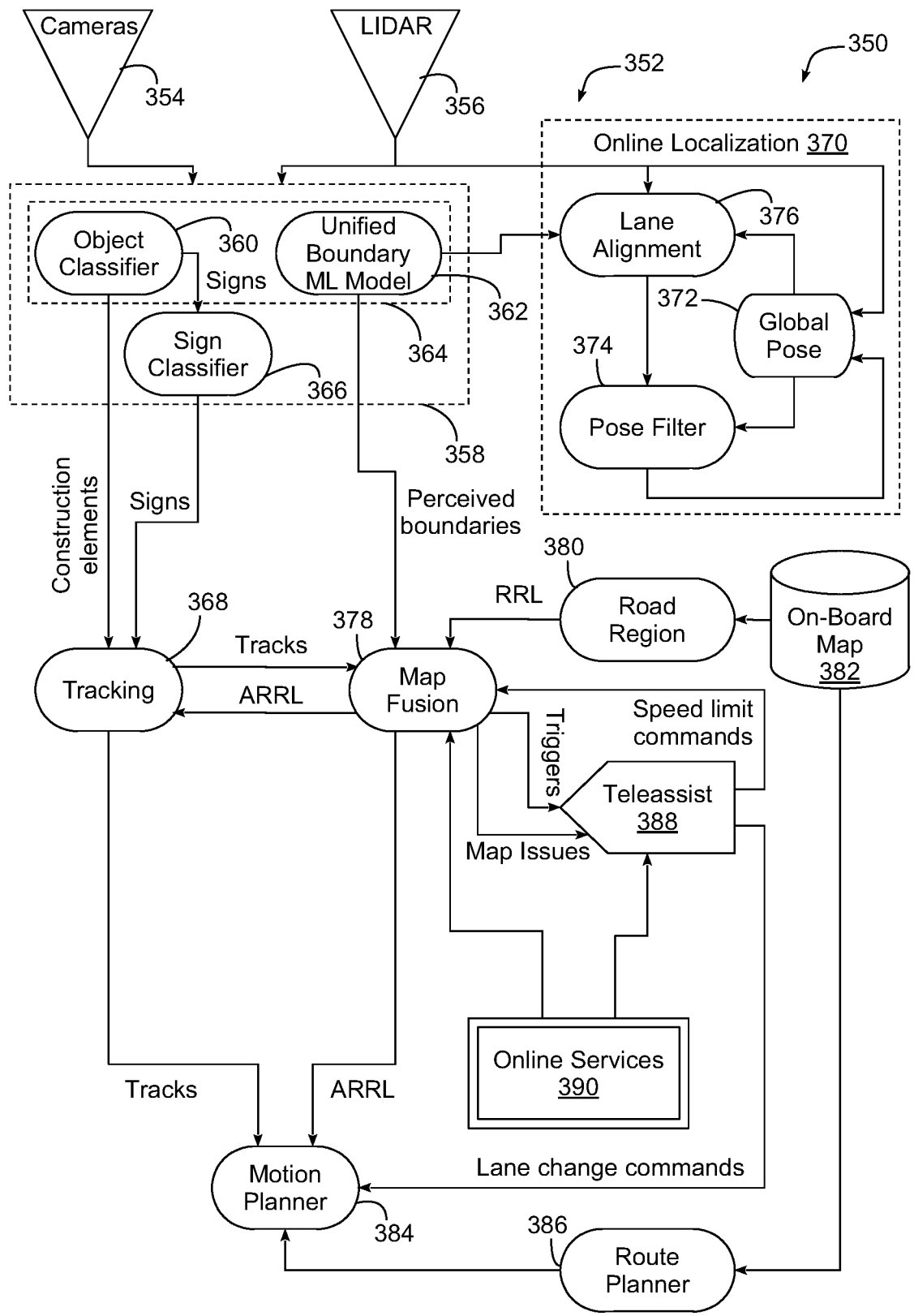
FIG. 7 is a block diagram illustrating an example autonomous vehicle control system consistent with some implementations.

Now turning to FIG. 7, this figure illustrates an example autonomous vehicle 350 including an autonomous vehicle control system 352 that incorporates a unified boundary machine learning model consistent with some implementations. Autonomous vehicle control system 352 also interfaces with both a live map system and a teleassist system in connection with autonomously operating autonomous vehicle 350. It will be appreciated that in other implementations, an autonomous vehicle control system may interface only with a teleassist system or only with a live map system, or may interface with neither, so the invention is not limited to the specific implementation discussed herein. In addition, FIG. 7 illustrates only the components of autonomous vehicle control system 352 related to motion and route planning, so other components that are unrelated to such functions are omitted from the figure for simplification purposes.

One or more image sensors or cameras 354 and one or more LIDAR sensors 356 operate as the perception sensors used in connection with motion planning. Camera(s) 354 and LIDAR sensor(s) 358 output camera data to a perception component 358, within which resides an object classifier component 360 that may be used as a mainline perception component to identify physical objects in the environment surrounding the autonomous vehicle. While component 360 may detect a wide variety of physical objects, from the perspective of the functionality described herein, two particular types of objects, construction elements and signs, are separately illustrated as being output by object classifier component 360. Other types of objects, e.g., other vehicles, pedestrians, etc., may also be detected by component 360. It will be appreciated, however, that the types of objects that may be detected are innumerable, and that a perception component may be configured to detect many other types of objects in other implementations, so the output of construction elements and signs as illustrated in FIG. 7 is merely for the purposes of explanation. In some implementations, object classifier component 360 may be implemented using one or more trained machine learning models and/or using one or more engineered/heuristic algorithms.

Perception component 358 also includes a unified boundary machine learning model 362 configured to detect various types of boundaries capable of being perceived by autonomous vehicle 352. In some implementations, unified boundary machine learning model 362 may be distinct from object classifier component 360 and/or perception component 358; however, as represented at 364, in some implementations unified boundary machine learning model 362 may be integrated with object classifier component 360, e.g., with both components representing one or more output heads of a multi-head machine learning model such as described above in connection with FIGS. 3-4.

Perception component 358 may also include a sign classifier component 366 that receives the objects detected as being signs by object classifier component 360 and determines the logical significance of such signs, e.g., the type of sign (speed limit, warning, road closure, construction notification, etc.), whether the sign is cautionary or mandatory, a location and/or lane that is affected by the sign (e.g., right lane closed 2 miles ahead), etc. In other implementations, the functionality of components 360, 366 may be combined, or additional purpose-specific classifier components may be used. In some implementations, sign classifier component 366 may be implemented using one or more trained machine language models and/or using one or more engineered/heuristic algorithms.

The objects detected by components 360, 366 are provided to a tracking component 368 that maintains tracks for each of the detected objects (as well as other stationary and/or moving objects detected in the environment) over time. It will be appreciated that since the autonomous vehicle is generally in motion, tracks may still be used to represent stationary objects since their relative location to the autonomous vehicle changes over time due to the movement of the autonomous vehicle itself. In some implementations, for example, a track may represent the 4D bounds of an object over time, and may be derived from a set of observations ("detections" and "classifications"). In such implementations, a track may define the real-world object in time and space regardless of whether that real world object is moving, and may effectively operate as an interface between perception and motion planning.

Camera(s) 354 and/or LIDAR sensor(s) 356 may also provide output to other components in autonomous vehicle control system 352. For example, the output may also be provided to an online localization component 370 that determines the current location and orientation (e.g., a pose) of the autonomous vehicle. A global pose component 372 may receive the output of LIDAR sensor(s) 356 to determine a global pose for the autonomous vehicle, which is output to a pose filter component 374 and fed back as an additional input to global pose component 372. The global pose may also be output to a lane alignment component 376 that receives as input the output of LIDAR sensor(s) 356 and an output of trained unified boundary machine learning model 362, and provides another input to pose filter 374, although in some implementations the global pose may not be an input to lane alignment component 376. Lane alignment may be an input used for determining a global pose in some implementations. Unified boundary machine learning model 362 in particular may provide lane alignment component 376 with one or more perceived painted lane boundaries, i.e., painted or taped lines delineating the lanes on a roadway, to serve in localizing the autonomous vehicle within a lane.

A map fusion component 378 receives as input the tracks output by tracking component 364 and the perceived boundaries from unified boundary machine learning model 364, which together may be considered to represent at least a portion of the perception observation data collected by the sensors of the autonomous vehicle. In addition, a road region generator component 380 retrieves map data from on-board map 382 and generates a baseline road region layout (RRL) representing a digital map of the area road region surrounding the autonomous vehicle. Map fusion component 378 fuses these inputs together to generate an augmented road region layout (ARRL) that is provided to a motion planner component 384 that generates a trajectory or path of motion for the autonomous vehicle at least partially upon the augmented road region layout.

Motion planner component 384 may also receive as input at least a portion of the tracks output by tracking component 368 and a desired route from a route planner component 386, which is generally generated from on-board map 382 and provides high level guidance as to a desired route to reach a desired destination.

Moreover, a teleassist component 388 may be operatively coupled to map fusion component 378 and motion planner component 384 to provide an interface with a remote teleassist system (not shown in FIG. 7) Teleassist component 388 may output, for example, observation data to map fusion component 378 to incorporate into an augmented road region. One non-limiting example is a speed limit command, e.g., to supply a maximum speed an autonomous vehicle may travel at in certain lanes or roadways, or within a construction zone. Teleassist component 388 may also output, for example, suggested actions to motion planner component 384, e.g., to change lanes, to stop or pull over to the side of the road, etc. Teleassist component 388 may also receive an augmented road region layout from map fusion component 378 (or any of the other data collected thereby) to assist a remote teleassist operator in providing assistance to the autonomous vehicle during a teleassist session. Further, in some implementations, various triggers (e.g., to trigger a teleassist session in response to detection of speed limit or construction signs), as well as various map issues (e.g., based upon discrepancies determined between digital map data and perceived boundaries) may also be provided by map fusion component 378 to teleassist component 388. Online services 390, including a remote teleassist system and a live map system similar to that described above in connection with FIG. 2, may be interfaced with map fusion component 378 and teleassist component 388, e.g., to provide observation data and/or location-based teleassist triggers to map fusion component 378 and to exchange information with a teleassist operator during a teleassist session.

It will be appreciated that the architecture of autonomous vehicle control system 352 is merely exemplary in nature, and other architectures may be used in other implementations. For example, some or all of the components in autonomous vehicle control system 352 may be implemented using programmed logic (e.g., implementing engineered/heuristic algorithms) and/or trained machine learning models, and that implementation of such components would be well within the abilities of those of ordinary skill having the benefit of the instant disclosure.

Figure 8:
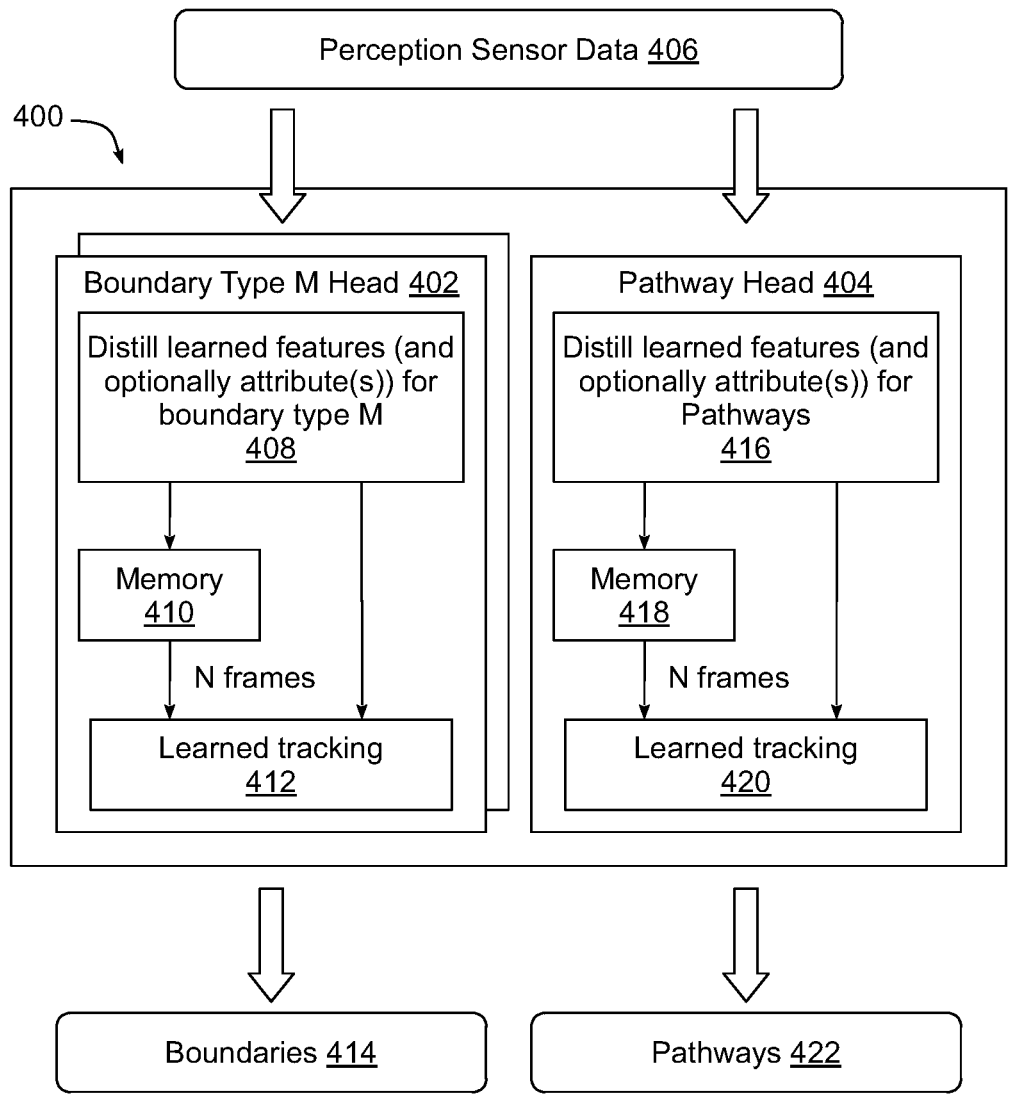
FIG. 8 is a block diagram illustrating an example trained unified boundary machine learning model incorporating learned tracking and learned attributes consistent with some implementations.

Now turning to FIG. 8, in some implementations, a trained unified boundary machine learning model may additionally support one or both of learned tracking and learned attributes. With learned tracking, boundaries (and in some instances, pathways) may be tracked over multiple intervals to associate the boundaries detected in each interval with boundaries detected in other intervals, thereby effectively persisting boundaries across intervals and improving consistency from interval to interval. With learned attributes, one or more attributes may be detected for various boundaries to provide additional semantic content about a boundary or scene.

One type of attribute that may be learned in some implementations is a sidedness attribute, which identifies which side of a detected boundary allows for vehicle travel, and may be utilized downstream, e.g., to reduce uncertainty during motion planning. In some implementations, for example, sidedness may allow an autonomous vehicle to identify when it has entered a non-drivable region and needs to return to a drivable region, or when it is driving adjacent to a non-drivable region and needs to avoid entering that non-drivable region. As one non-limiting example, an autonomous vehicle may be operating on a four-lane divided highway that has been reduced to the left lane in one direction due to temporary construction occurring in the right lane and delimited by barrels. If, however, the autonomous vehicle is in stop and go traffic, and sitting behind a semi trailer, and if a large break exists between barrels, it may not be readily apparent to the perception system of the autonomous vehicle that it is still within the construction area. Nonetheless, if a sidedness attribute has been set for the boundary associated with the center dashed line that indicates that driving is only permitted to the left of the boundary, the autonomous vehicle may be discouraged from changing into the right lane even though the perception system does not presently detect any construction elements in the roadway.

Another type of attribute that may be learned in some implementations is an active attribute, which generally indicates whether there is an active condition in the vicinity of the boundary that should trigger some operational change in the autonomous vehicle, e.g., to change lanes and/or reduce speed. For example, one type of an active attribute that may be used is an active construction attribute that indicates whether construction is actively occurring proximate the boundary. It will be appreciated that, particularly for large construction projects, active work may only be ongoing in relatively small areas of the overall construction area, e.g., only where construction workers or operational construction equipment are present. Thus, it may be desirable in some implementations to incorporate into a trained unified boundary machine learning model detection of active construction, and to associate with any affected boundaries an active construction attribute and thereby cause the autonomous vehicle to reduce speed and/or change lanes, or perform some other predetermined action.

Likewise, an active attribute in some implementations may be an active hazard attribute associated with the presence of other potential hazards detected on the roadway, e.g., stopped or disabled vehicles, parked police, construction or emergency vehicles, tow trucks, etc. Thus, it may be desirable in some implementations to incorporate into a trained unified boundary machine learning model detection of potential hazards or other conditions along the roadway, and to associate with any affected boundaries an active attribute and thereby cause the autonomous vehicle to reduce speed and/or change lanes, or perform some other suitable action.

Attributes may be associated with boundaries in some implementations, or with individual segments of boundaries, and in some implementations, attributes may be associated with entire scenes.

One example manner of implementing both learned tracking and learned attributes is illustrated by trained unified boundary machine learning model 400 of FIG. 8. Model 400 in some implementations may be a trained multi-head machine learning model similar to trained multi-head machine learning model 248 of FIG. 3, but including additional tracking functionality as well as additional training for detecting attributes such as sidedness and/or active attributes. Model 400, for example, may include a plurality of boundary type heads 402 trained to detect various types of boundaries, and in some instances, one or more pathway heads 404 trained to detect various types of pathways (e.g., ego pathways and/or other vehicle pathways). Model 400 receives perception sensor data 406, e.g., image data, e.g., as captured by one or more cameras or image sensors (e.g., a camera with a forward-facing field of view) and LIDAR data, e.g., as captured by one or more LIDAR sensors. Additional heads, e.g., mainline object detecting heads, may also be used, but are omitted from FIG. 8 for simplicity.

In each boundary type head 402, a feature detection stage 408 distills various learned features, including, in some instances, one or more attributes, associated with a particular boundary type M among the various boundary types supported by the model. Feature vectors are output both to a memory 410 that maintains one or more (i.e., 1 . . . N) prior frames or intervals, as well as to a learned tracking stage 412, which is trained to track boundaries over multiple frames or segments, and which outputs various detected boundaries, optionally tagged with one or more attributes, as illustrated at 414.

Similarly, if pathways are also supported, pathway head 404 includes a feature detection stage 416 that distills various learned features, including, in some instances, one or more attributes, associated with one or more types of pathways. Feature vectors are output both to a memory 418 that maintains one or more (i.e., 1 . . . N) prior frames or intervals, as well as to a learned tracking stage 420, which is trained to track pathways over multiple frames or segments, and which outputs various detected pathways, optionally tagged with one or more attributes, as illustrated at 422. In some implementations, the boundary heads and pathway heads may share a backbone network.

It will be appreciated that other types of machine learning architectures or algorithms that support memory or feedback, including, for example, various Recurrent Neural Network (RNN) architectures, Long Short-Term Memory (LSTM) architectures, etc., may be used in various implementations. Implementation and training of a machine learning model to incorporate the aforementioned functionality would be well within the abilities of those of ordinary skill having the benefit of the instant disclosure.

Figure 9:
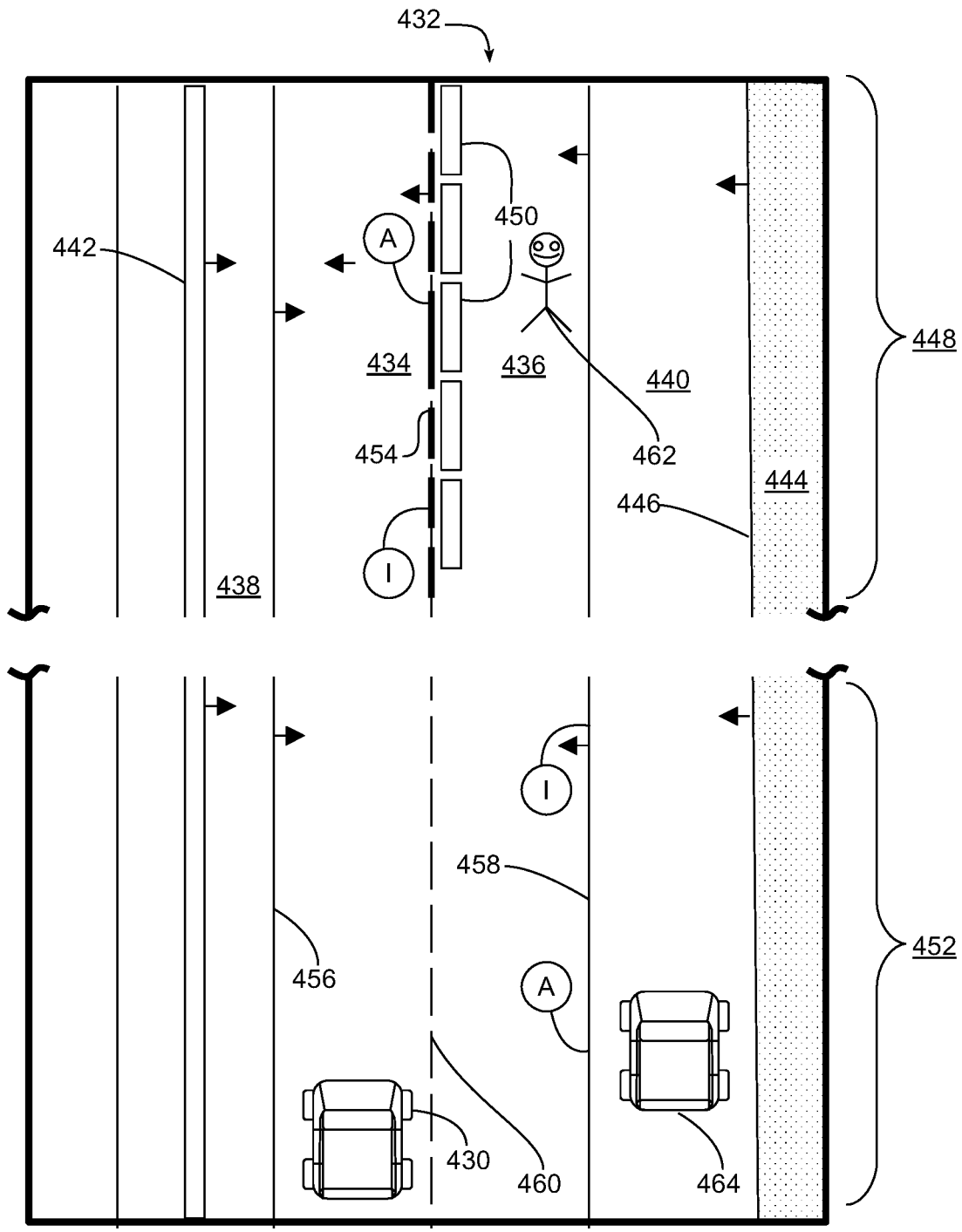
FIG. 9 illustrates another example roadway incorporating various types of boundaries capable of being encountered by an autonomous vehicle.

FIG. 9 illustrates an example roadway to further describe how attributes may be assigned to various perceived boundaries by a unified boundary machine learning model in some implementations. An autonomous vehicle 430, for example, is illustrated as traveling on a four-lane divided roadway 432 including a pair of same-direction lanes 434, 436 separated by shoulders 438, 440 from a permanent concrete median barrier 442 and a non-road (e.g., grass) area 444. A road edge 446 separates shoulder 440 from non-road area 444, and in the upper half of the example illustration, a construction area 448 is defined by a plurality of spaced apart construction elements 450 (here, jersey barriers) that effectively close lane 436 and divert all traffic into lane 434. In the lower half of the example illustration, a non-construction area 452 is defined, where no construction is currently underway and both lanes 434, 436 are available for travel.

Within this example roadway, a number of different perceived boundaries, each having a one of a plurality of different semantic boundary types, may be generated and used in the control of an autonomous vehicle. For example, perceived boundaries associated with a physical barrier semantic boundary type are represented by permanent concrete median barrier 442 and boundary 454 that is defined by jersey barriers 450, and a perceived boundary associated with a road edge semantic boundary type is represented by road edge 446 defined between shoulder 440 and non-road area 444. Perceived boundaries associated with a painted lane semantic boundary type are represented by solid painted lines 456 and 458 and dashed painted line 460.

As noted above, in some implementations, one or more attributes may be associated with boundaries or portions of boundaries. For example, arrows illustrated next to median barrier 442, road edge 446 and boundaries 454, 456, and 458 represent learned sidedness, i.e., the side of the boundary upon which travel is permitted. As noted above, some boundaries do not have a sidedness attribute, e.g., boundary 460 associated with a dashed line, which allows for travel on each side of the boundary.

In addition, various active attributes may be associated with boundaries, portions of boundaries (e.g., boundary segments) or even regions or scenes. As one example, and as represented by the 'A' label on boundary 454, at least a portion of boundary 454 may be associated with an active attribute representative of an active construction area (e.g., as a result of the presence of construction workers 462). Likewise, as represented by the 'A' label on boundary 458, at least a portion of boundary 454 may be associated with an active attribute representative of a vehicle 464 (e.g., a disabled vehicle, a police vehicle, an emergency vehicle, a tow truck, etc.) being stopped in shoulder 440. In both instances, the use of an active attribute associated with the boundary may be used to trigger an operational change in the autonomous vehicle, e.g., to change lanes and/or reduce speed.

Furthermore, as represented by the 'I' labels on other segments of boundaries 454 and 458, attributes may not be assigned to entire boundaries, e.g., only certain boundary segments or areas, such that, for example, where construction is only ongoing in one area but not another, or where no vehicles are present in the shoulder, the actions undertaken in response to active attributes may not be performed.

Figure 10:
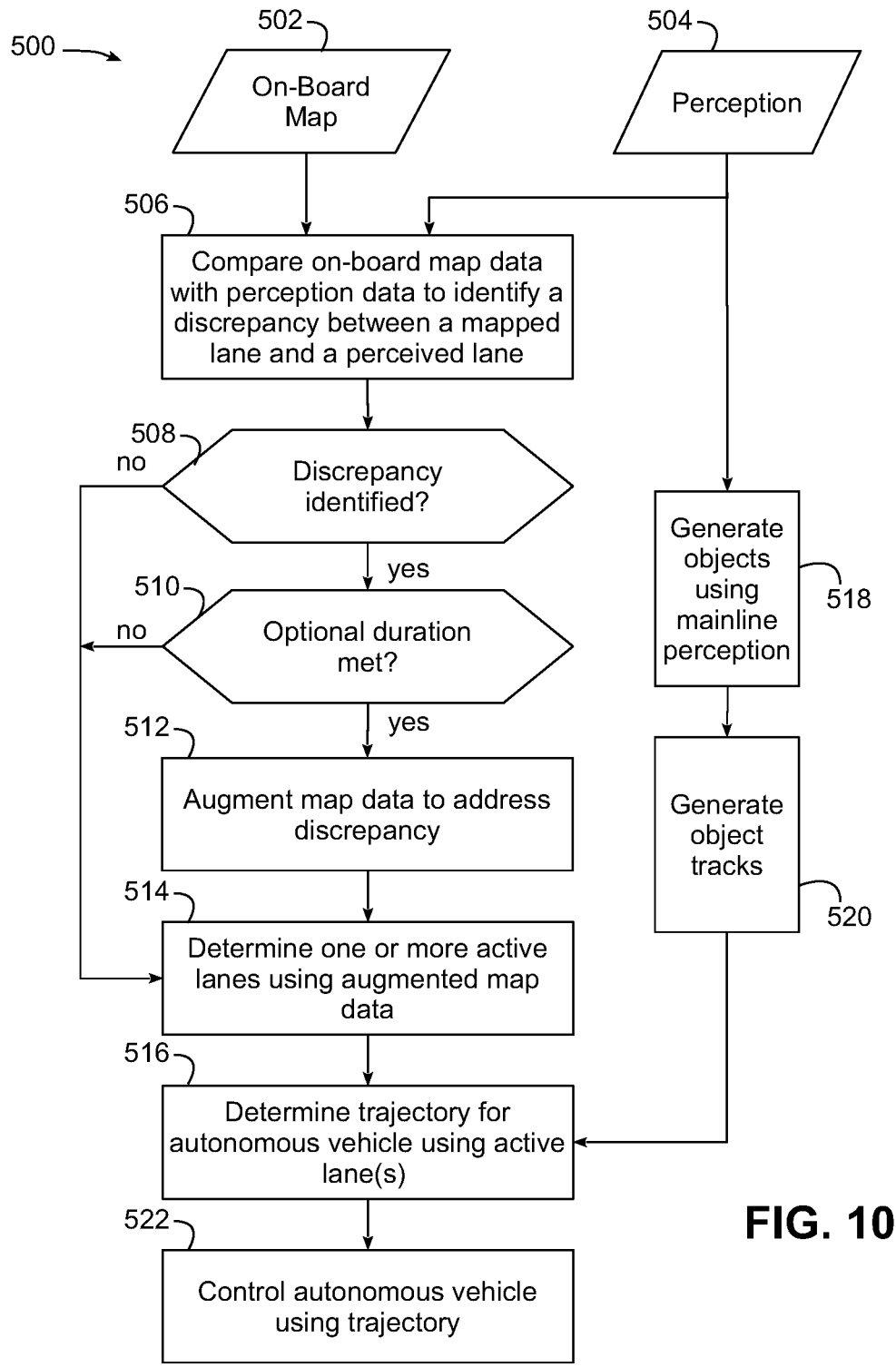
FIG. 10 is a flowchart illustrating an example operational sequence for controlling an autonomous vehicle based upon identified discrepancies between mapped and perceived lanes consistent with some implementations.

Dynamic Augmentation Of Autonomous Vehicle Map Data Using Perceived Lane Elements Now turning to FIG. 10, it may also be desirable in some implementations to use the lane elements perceived by a perception system, e.g., using a trained unified boundary machine learning model as discussed above, to identify potential discrepancies between the boundaries, lanes and/or pathways defined in stored map data and what is currently being perceived by the perception system of that autonomous vehicle. Such identified discrepancies may, in turn, be addressed by dynamically augmenting the map data such that downstream consumers of the map data, e.g., a motion controller component, may utilize a pathway generated for a perceived lane in the roadway to operate the autonomous vehicle along the roadway and may utilize one or more perceived pathways for correct actor intent prediction.

FIG. 10, in particular, illustrates an example operational sequence 500 for controlling an autonomous vehicle (e.g., autonomous vehicle 202 of FIG. 2) based upon stored map data, e.g., as maintained in an on-board map 502, as well as perception data, e.g., as output by a perception component 504. On-board map 502, for example, may be implemented similar to on-board map 212 as discussed above, while perception component 504 may be implemented similar to perception component 214, and in some implementations may include a trained unified boundary machine learning model implemented in a similar fashion to the various implementations discussed above. In other implementations, however, other perception components, including perception components utilizing other types of trained machine learning models or otherwise, may be used to generate the perception data utilized herein.

The stored map data and perception data are compared in block 506 to attempt to identify a discrepancy between a mapped lane, i.e., a drivable lane on the roadway defined in the on-board map, and a perceived lane determined from the perception component. As an example, if construction has been initiated along a divided highway and one or more lanes on the roadway have been shifted some distance from their original locations (e.g., by depositing new painted lines on the roadway, or by placing cones, barrels, jersey barriers, etc. along the roadway), the drivable lane(s) of the roadway as detected by the perception component will not align with the mapped lane(s) of the roadway, so it will be understood that the original mapped lanes will not be suitable for use in navigating the autonomous vehicle.

Thus, block 508 determines whether a discrepancy has been identified, and if so, passes control to block 510 to determine if a predetermined detection duration has been met. For example, in some implementations, it may be desirable to require a discrepancy to be detected over multiple consecutive detection intervals prior to augmenting the map data, and thereby filter out any mis-identified discrepancies from individual detection intervals. Alternatively, block 510 may be omitted in some implementations.

Assuming first that a discrepancy has been detected over a sufficient duration, control passes from block 510 to block 512 to augment the map data (e.g., to generate an augmented road region) to address the identified discrepancy, e.g., by augmenting the map data to identify a pathway that may be used to navigate the autonomous vehicle along the roadway, such as within a perceived lane determined from the perception data. In addition, in some implementations, the augmentation may also include other operations such as disabling, hiding, deleting, or otherwise deactivating one or more mapped lanes represented in the map data to cause the motion planner to effectively ignore the mapped lane when determining the trajectory of the autonomous vehicle. Augmentation in some implementations may also involve adding new/additional lane content, including lane content for individual or multiple lanes, as well as lanes from painted boundaries or construction inferences, as well as updating/deleting any lane content, or any combination thereof.

Next, in block 514 one or more active lanes in the roadway are determined using the augmented map data, and a trajectory for the autonomous vehicle is determined using the active lane(s) in block 516, both of which may be performed, for example, in a motion planner component. In other implementations, block 514 may be performed in a map fusion component. In addition, the motion planner component may also optionally utilize one or more object tracks in order to determine the trajectory for the autonomous vehicle. For example, in block 518, one or more objects may be generated using mainline perception similar to block 312 discussed above, and in block 520, a tracking component may generate tracks for the generated objects such that the determination of the trajectory in block 516 also uses the generated object tracks. The autonomous vehicle is then controlled in block 522 using the determined trajectory. Returning to blocks 508 and 510, if no discrepancy is identified, or if any discrepancy has not been detected over enough detection intervals, block 512 is bypassed, so that the determination of the active lanes and the trajectory in blocks 514 and 516, and the control of the autonomous vehicle in block 518, is based on non-augmented map data.

The stored map data provided by on-board map 502, and the perception data output by perception component 504, may include various types of data associated with the lanes, boundaries and/or pathways associated with the roadway, e.g., various stored and/or perceived lane elements (including, in some implementations, boundary-type lane elements and/or pathway-type lane elements). In some implementations, some lane elements may also directly define portions of a lane, separate from boundaries and/or pathways. In the illustrated implementation, for example, the stored map data may include a road region layout that includes map data such as various boundaries for the roadway, one or more lanes for the roadway, as well as additional data such as road edges, representing the outer physical extents of the roadway, signs and other static and/or logical objects, and other map data that may be utilized by a motion planner component to generate a trajectory for the autonomous vehicle. The perception data output by perception component 504 may include various lane elements (e.g., boundaries and/or pathways) detected along the roadway, including semantic boundary types assigned to each of the various boundaries, as well as object tracks associated with various objects in the environment. In other implementations, however, the stored map data and/or the perception data may represent a roadway in other manners, including using various combinations of lane elements, boundaries, lanes and/or pathways, so the invention is not limited to the specific representations of a roadway described herein.

Figure 11:
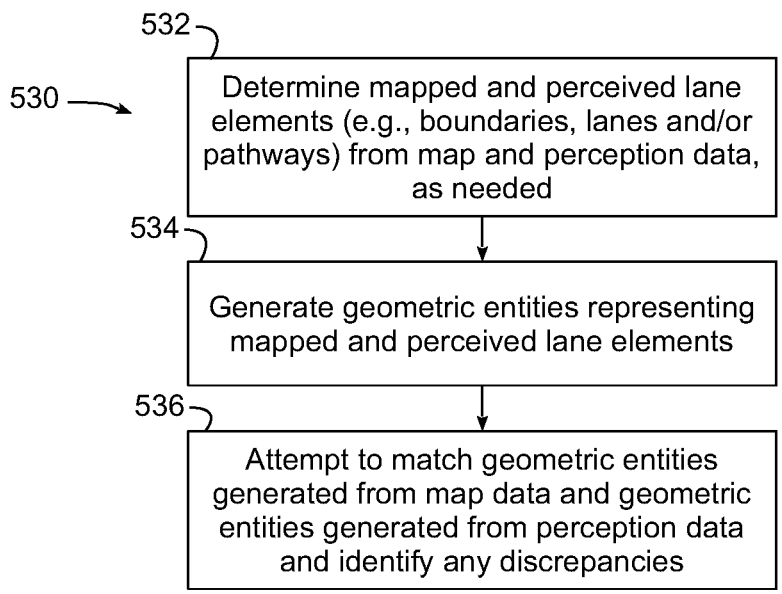
FIG. 11 is a flowchart illustrating an example implementation of a discrepancy identification operation performed in block 506 of FIG. 10.

As noted above, the stored map data and the perception data may be used to identify a discrepancy between a mapped lane and a perceived lane in block 506 of FIG. 10, which is referred to herein as a discrepancy identification operation. One example manner of implementing such an operation is illustrated by operational sequence 530 of FIG. 11, which begins in block 532 by determining mapped and perceived lane elements (e.g., boundaries, lanes and/or pathways) from the map and perception data. In some implementations, the map and/or perception data may be output in a format that is suitable for discrepancy identification, while in other implementations, one or both of the map and perception data may be processed to obtain suitable data for performing discrepancy identification. For example, in some implementations, the perception component may output perceived boundaries, but may not output perceived lanes associated with such boundaries, so identification of a discrepancy between a mapped lane and a perceived lane may be based upon analysis of individual mapped and perceived boundaries, rather than a direct comparison of a mapped lane and a perceived lane, and one or both of the map data and the perception data may need to be processed to generate suitable data for discrepancy identification (e.g., to generate a lane from a pair of boundaries, to generate boundaries and/or a centerline from a lane, etc.). Thus, it should be appreciated that while the implementations discussed herein describe the identification of a discrepancy between a mapped lane and a perceived lane, such an identification is not limited to a direct comparison of data structures representing the extents of mapped and perceived lanes, but may also include other comparisons based on data representing other aspects of a roadway (e.g., the boundaries and/or pathways/centerlines that may be used to define a lane in some implementations) and other metadata to inform probabilistic, or confidence based reasoning, or to facilitate a learned model. For example, the perception system in some implementations may provide confidence bounds on the spatial locations and attributes of detected boundaries, occlusion masks, consistency scores (temporal integration), etc.

Next, in block 534, geometric entities may be generated to represent the mapped and perceived lane elements (e.g., boundaries, lanes and/or pathways). In one example implementation, in particular, mapped and perceived boundaries may be represented by one or more linear and/or curvilinear geometric entities such as polylines or cubic splines, and discrepancy identification may be based on a comparison of such line representations. In such an implementation, polylines or cubic splines may be generated from mapped lanes in the event that the map data does not include specific boundary data structures. It will be appreciated, however, that other geometric entities, including other straight and/or curved line representations, as well as various polygonal or other two-dimensional shape representations, may be generated in other implementations. In some cases, perceived elements and map elements may be compared directly to each other without transforming them to other representations, and block 534 may be omitted. In addition, in some implementations, geometric entities may be generated to represent pathways, such that discrepancy identification may be based on a comparison of the geometric entities representing pathways.

Next, in block 536, an attempt is made to match the geometric entities generated from the map data with the geometric entities generated from the perception data in order to identify any discrepancies. Discrepancies may be identified, for example, based upon identifying a lane element (e.g., a boundary, lane, or pathway) present in the map data but missing from the perception data, or vice versa, or by identifying that the position of a lane element in the map data that corresponds to a lane element in the perception data is substantially different from the position of that in the perception data. In some implementations, discrepancies may also be identified at least in part based upon boundary attributes or styles (e.g., solid vs. dashed painted lines, yellow vs. white painted lines, etc.). It will be appreciated that thresholds may be used to determine when two geometric entities are close enough to be considered to be matched, as well as to determine when the positions of those geometric entities is different enough to be considered a discrepancy. In addition, weighting may be used in some implementations, e.g., to more heavily weight closer perceived lane elements (which are often more reliable) than more distant perceived lane elements. In still other implementations, a machine learning model may be trained to associate geometric entities with one another to identify discrepancies. It will be appreciated that more than one discrepancy, for more than one lane, may also be detected concurrently in some implementations (e.g., where multiple lanes are shifted in a construction zone).

Figure 12:
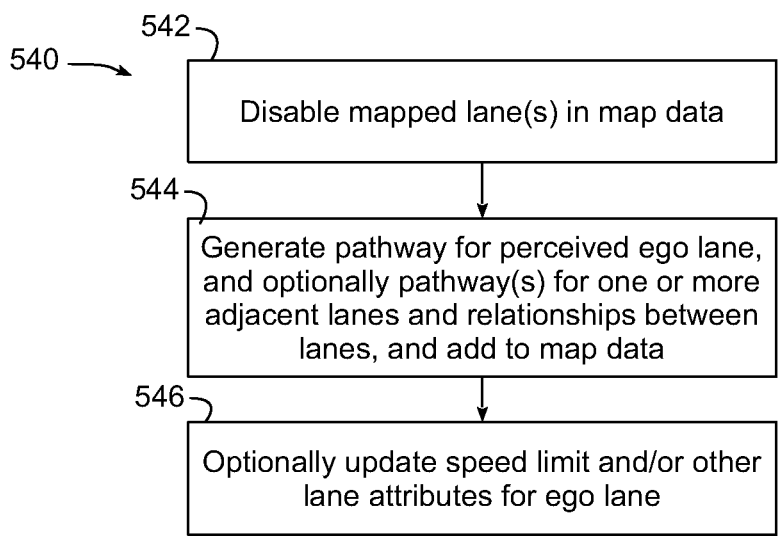
FIG. 12 is a flowchart illustrating an example implementation of a map data augmentation operation performed in block 506 of FIG. 10.

As a result, one or more discrepancies may be identified in operational sequence 530, and in some implementations, such identification may trigger addressing the discrepancy, in particular by performing a map data augmentation operation represented by block 512 of FIG. 10. One example manner of implementing such an operation is illustrated by operational sequence 540 of FIG. 12, which begins in block 542 by disabling all of the mapped lanes in the map data. A mapped lane may be disabled in some implementations by deleting the mapped lanes from the augmented map data, while in other implementations, the mapped lanes may be disabled in other manners, e.g., by marking them as disabled in the augmented map data, or assigning them to a list or other data structure that specifies that they should be skipped when traversing a tree or graph representing a road region. In some implementations, for example, mapped lanes may be defined by pathway elements, and a mapped lane may be disabled by omitting the associated pathway element from the augmented map data.

In addition, in some implementations, it may be desirable to activate a dedicated "perceived" mode for the autonomous vehicle, whereby the autonomous vehicle is controlled to be operated based upon perceived boundaries, lanes and/or pathways. In other implementations, mapped lanes may not be disabled. In still other implementations, an autonomous vehicle may always be operated based on fused lanes, using the HD map as a prior.

Next, in block 544, a pathway is generated for a perceived ego lane, i.e., the perceived lane within which the autonomous vehicle is currently operating. The pathway may be represented in a number of manners, e.g., by determining left and right boundaries or guides for the pathway and/or determining a centerline for the pathway, in some instances based upon the positions of the perceived lane elements defining the perceived lane. A pathway may also be defined by a plurality of path segments (e.g., path segments defining a centerline of the path) that are linked to one another in some implementations. In addition, in some implementations, pathways corresponding to one or more additional lanes, e.g., one or more adjacent lanes for the roadway, may also be added, along with relationships between lanes (e.g., to identify when lane changes are permissible or not), thereby enabling a motion planner component to consider the desirability of changing lanes even when operating based upon perceived lane elements. However, in other implementations, only an ego lane and pathway may be generated to simplify augmentation and navigation.

Next, in block 546, it may also be desirable in some implementations to update a speed limit and/or other lane attributes for the ego lane and pathway and/or any adjacent lanes or pathways, e.g., based upon the last used speed limit from the map data. In some instances, speed limits that were associated with disabled map lanes may be associated with a perceived lane, or with the edge of the roadway. In addition, other attributes, such as the addition of stop signs or other road signs that apply to one or more lanes.

In some implementations, augmented map data may retain the same general format as the map data output by the on-board map, and an Application Programming Interface (API) used by downstream consumers of map data may be generic to both augmented and un-augmented map data. By doing so, consumers of the map data (e.g., a motion planner component) may be able to use the augmented map data in a similar manner to non-augmented map data, e.g., to query for lanes or pathways in the same manner and/or call the same functions, regardless of whether the map data is augmented or un-augmented.

Figure 13:
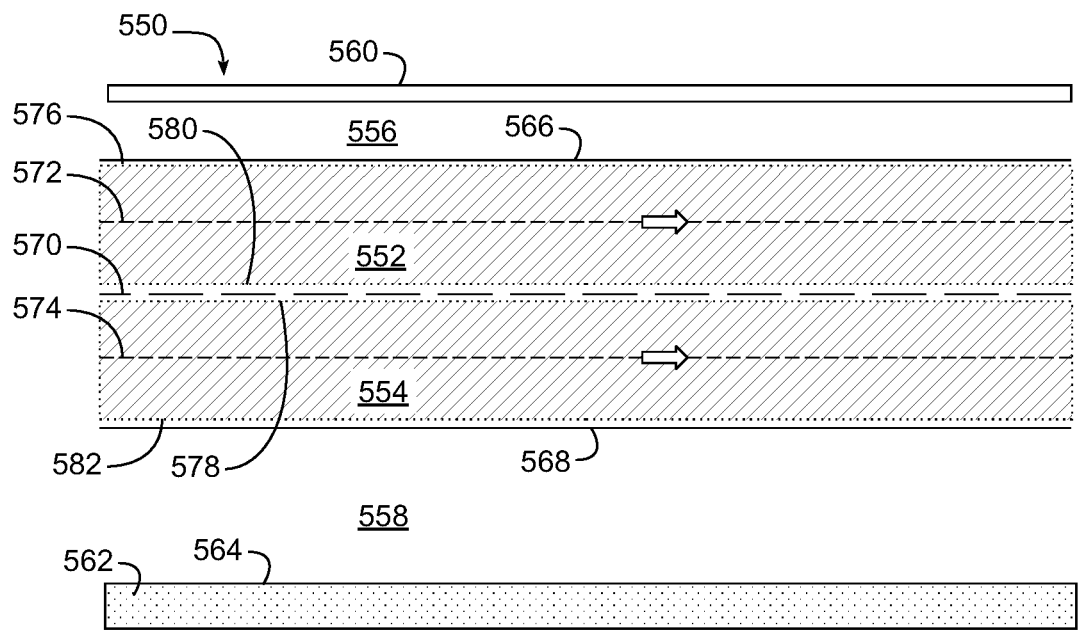
FIG. 13 illustrates example map data stored for a portion of a roadway.
Figure 14:
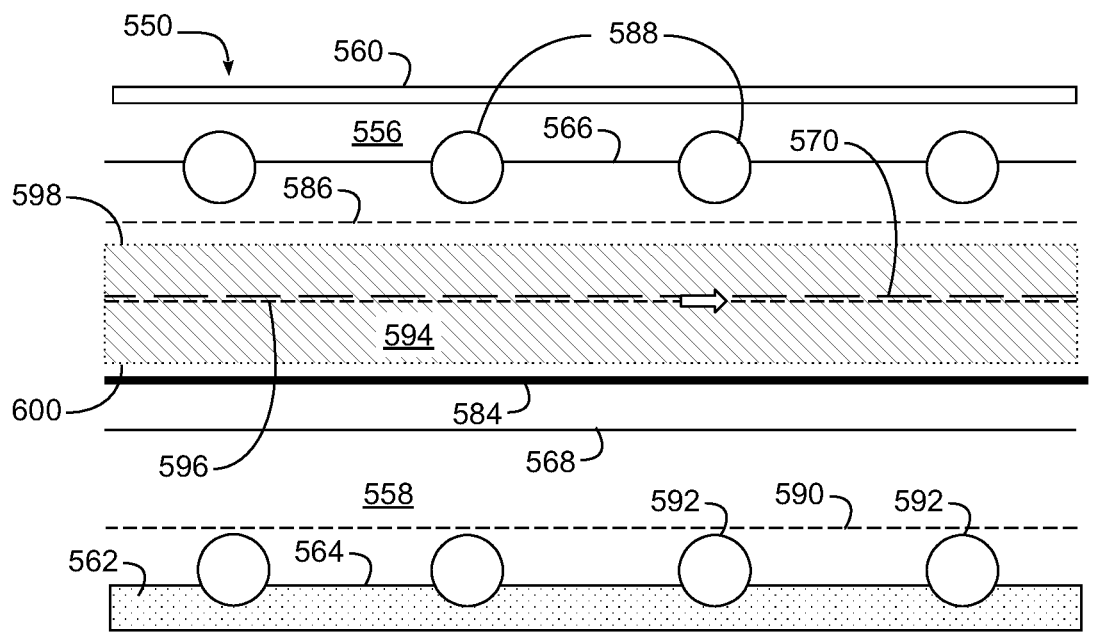
FIG. 14 illustrates the example map data of FIG. 13, and augmented based upon various objects and boundaries detected by a perception system to incorporate a lane corresponding to an ego pathway, consistent with some implementations.
Figure 15:
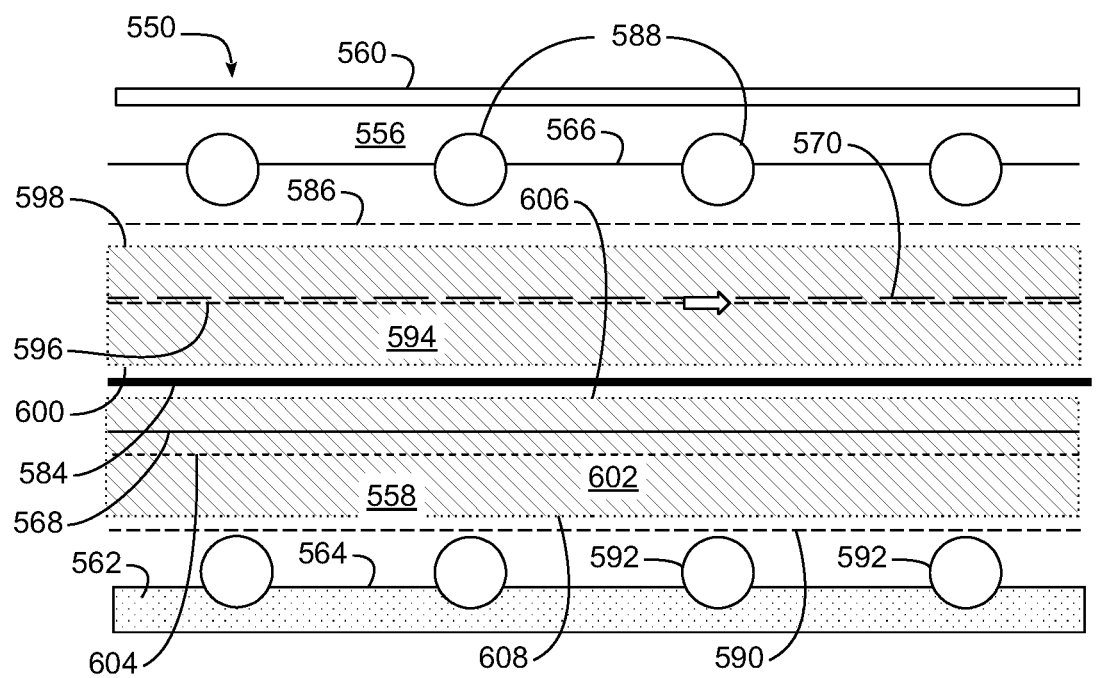
FIG. 15 illustrates the example map data of FIG. 13, and augmented based upon various objects and boundaries detected by a perception system to incorporate a lane corresponding to an ego pathway and an adjacent lane, consistent with some implementations.

FIGS. 13-15 next illustrate an example roadway to further describe how map data may be augmented to enable an autonomous vehicle to operate using perceived lane elements in response to identified discrepancies. FIG. 13 in particular illustrates a stored map data representation of a roadway 550, which defines a pair of same-direction lanes 552, 554 bordered by a pair of shoulders 556, 558 bordering a permanent concrete median barrier 560 and a non-road (e.g., grass) area 562. A road edge 564 separates shoulder 558 from non-road area 562, while a pair of solid painted lines 566 and 568 are represented as boundaries between lane 552 and shoulder 556, and between lane 554 and shoulder 558, respectively. A dashed white painted line 570 is represented as a boundary between lanes 552 and 554. In some implementations, each lane 552, 554 may represent a pathway for an autonomous vehicle, and may be represented, for example, using a centerline 572, 574, left boundaries or guides 576, 578, and/or right boundaries or guides 580, 582.

With reference to FIG. 14, assume that when an autonomous vehicle (not shown in FIG. 14) is present on the roadway and detects a number of perceived boundaries, e.g., a new painted line type boundary 584 that has been applied to the roadway as well as a virtual construction type boundary 586 defined by a plurality of detected cones or barrels 588 and a virtual construction type boundary 590 defined by a plurality of detected cones or barrels 592. Also detectable are the original solid white painted lines 566, 568 and dashed white painted line 570. When processing the perception data in the manner described above in connection with FIGS. 10-12, a discrepancy may be determined between the mapped lanes 552, 554 and a perceived lane 594 that is effectively defined by perceived boundaries 584, 586, e.g., as a result of attempting to match perceived boundaries 584, 586 with the mapped boundaries 566, 568, and 570. Based upon the identified discrepancy, the map data may be augmented, e.g., using a centerline 596 and/or left and right boundaries or guides 598, 600 to define a pathway along the roadway. In addition, as represented by the omission of lanes 552, 554 from FIG. 14, the mapped lanes may be disabled in the augmented map data, such that a motion planner component consuming the augmented map data will generate a trajectory based upon the single ego lane or pathway now represented in the augmented map data.

Notable in this implementation is that a single ego lane or pathway is generated (e.g., based upon where the autonomous vehicle is currently operating), so even if other potential lanes or pathways are available, no additional lanes are added to the augmented map data. As illustrated in FIG. 15, however, in other implementations, it may also be desirable to augment the map data to include a pathway corresponding to one or more adjacent lanes, e.g., for lane 602 a pathway defined by a centerline 604 and/or left and right boundaries or guides 606, 608. In some implementations, it may not be desirable to define a pathway or lane that overlaps shoulder 558; however, in other implementations, it may be permissible to do so. Furthermore, the support for adjacent perceived lanes may also allow for lane changes to be planned by a motion planner component in appropriate circumstances.

It will be appreciated that, while certain features may be discussed herein in connection with certain implementations and/or in connection with certain figures, unless expressly stated to the contrary, such features generally may be incorporated into any of the implementations discussed and illustrated herein. Moreover, features that are disclosed as being combined in some implementations may generally be implemented separately in other implementations, and features that are disclosed as being implemented separately in some implementations may be combined in other implementations, so the fact that a particular feature is discussed in the context of one implementation but not another should not be construed as an admission that those two implementations are mutually exclusive of one another. Other variations will be apparent to those of ordinary skill. Therefore, the invention lies in the claims hereinafter appended.

What is claimed is:

1. An autonomous vehicle control system for an autonomous vehicle, comprising:
   one or more processors; and
   memory storing instructions that, when executed by the one or more processors, cause the autonomous vehicle control system to:
   receive baseline map data determined from on-board map data stored in an on-board map that describes a mapped lane on a roadway in an environment within which the autonomous vehicle operates;
   receive perception data describing at least one perceived lane element for the roadway that is based on sensor data sensed by at least one perception sensor of the autonomous vehicle during operation of the autonomous vehicle on the roadway;
   detect a discrepancy between the mapped lane described by the baseline map data and a perceived lane on the roadway that is defined by the at least one perceived lane element, wherein the discrepancy is detected by comparing at least one mapped lane element that represents the mapped lane with the at least one perceived lane element that defines the perceived lane to attempt to match the mapped lane with the perceived lane;
   in response to detecting the discrepancy, and while maintaining the on-board map data unaltered in the on-board map, augment the baseline map data to generate augmented map data, wherein the augmented map data describes a pathway for use in operating the autonomous vehicle in the perceived lane defined by the at least one perceived lane element;
   provide the augmented map data to a motion planner component to generate a trajectory for the autonomous vehicle using the augmented map data; and
   control the autonomous vehicle using the trajectory generated by the motion planner component using the augmented map data.

2. The autonomous vehicle control system of claim 1, wherein the pathway is an ego pathway within which the autonomous vehicle is operating, and wherein the one or more processors are configured to control the autonomous vehicle using the augmented map data by controlling the autonomous vehicle to follow the ego pathway.

3. The autonomous vehicle control system of claim 1, wherein the pathway is an adjacent pathway to an ego pathway within which the autonomous vehicle is operating.

4. The autonomous vehicle control system of claim 1, wherein the mapped lane is a first mapped lane for the roadway, the perceived lane is a first perceived lane for the roadway, and the pathway is a first pathway, wherein the baseline map data further describes a second mapped lane for the roadway, wherein the one or more processors are further configured to detect a second discrepancy between the second mapped lane and a second perceived lane in the roadway that is defined by the at least one perceived lane element, and wherein the augmented map data further describes a second pathway for use in operating the autonomous vehicle within the second perceived lane.

5. The autonomous vehicle control system of claim 1, wherein the one or more processors are further configured to, in response to the detected discrepancy, disable the mapped lane in the augmented map data such that the mapped lane is ignored by the motion planner component during generation of a trajectory for the autonomous vehicle.

6. The autonomous vehicle control system of claim 5, wherein the baseline map data includes a pathway element defining the mapped lane, wherein the one or more processors are configured to disable the mapped lane in the augmented map data by omitting the pathway element from the augmented map data.

7. The autonomous vehicle control system of claim 1, wherein the one or more processors are configured to augment the baseline map data to generate the augmented map data by identifying left and right boundaries of the pathway using the at least one perceived boundary.

8. The autonomous vehicle control system of claim 1, wherein the pathway is described in the augmented map data by a left boundary and a right boundary of the pathway.

9. The autonomous vehicle control system of claim 1, wherein the pathway is described in the augmented map data by a centerline of the pathway.

10. The autonomous vehicle control system of claim 1, wherein the one or more processors are configured to compare the at least one mapped lane element with the at least one perceived lane element by determining a mapped polyline or cubic spline that represents the at least one mapped lane element, determining a perceived polyline or cubic spline that represents for the at least one perceived lane element, and comparing the mapped polyline or cubic spline with the perceived polyline or cubic spline to attempt to match the mapped lane with the perceived lane.

11. The autonomous vehicle control system of claim 1, wherein the one or more processors are configured to determine if the discrepancy is detected over multiple consecutive intervals, and to augment the baseline map data in response to detecting the discrepancy during multiple consecutive intervals.

12. The autonomous vehicle control system of claim 1, wherein the one or more processors are further configured to generate the perceived lane from the at least one perceived lane element.

13. The autonomous vehicle control system of claim 12, wherein the one or more processors are further configured to generate a plurality of perceived boundaries for the roadway by processing sensor data received from the at least one perception sensor using a trained machine learning model that integrates detection of perceived boundaries associated with a plurality of semantic boundary types for the roadway.

14. The autonomous vehicle control system of claim 13, wherein the plurality of perceived boundaries includes a first perceived boundary associated with a virtual construction semantic boundary type of the plurality of semantic boundary types and second perceived boundary associated with an additional semantic boundary type of the plurality of semantic boundary types, and wherein the additional semantic boundary type for the second perceived boundary is a physical barrier semantic boundary type, a painted lane semantic boundary type, or a road edge semantic boundary type.

15. The autonomous vehicle control system of claim 13, wherein the trained machine learning model further integrates detection of sidedness attributes for at least a subset of the plurality of perceived boundaries, and wherein the one or more processors are configured to augment the baseline map data to generate the augmented map data using a sidedness attribute of the at least one perceived boundary.

16. The autonomous vehicle control system of claim 1, wherein the motion planner component is configured to access the augmented map data using an Application Programming Interface (API) that is generic to augmented and un-augmented map data.

17. The autonomous vehicle control system of claim 1, wherein the at least one perceived lane element is a boundary-type lane element or a pathway-type lane element.

18. The autonomous vehicle control system of claim 1, wherein the one or more processors are configured to augment the baseline map data to generate augmented map data by adding new map data, modifying at least a portion of the baseline map data and/or deleting at least a portion of the map data while maintaining the baseline map data unaltered in the on-board map.

19. A method of operating an autonomous vehicle, comprising:
receiving baseline map data determined from on-board map data stored in an on-board map that describes a mapped lane on a roadway in an environment within which the autonomous vehicle operates;
receiving perception data describing at least one perceived lane element for the roadway that is based on sensor data sensed by at least one perception sensor of the autonomous vehicle during operation of the autonomous vehicle on the roadway;
detecting a discrepancy between the mapped lane described by the baseline map data and a perceived lane on the roadway that is defined by the at least one perceived lane element, wherein the discrepancy is detected by comparing at least one mapped lane element that represents the mapped lane with the at least one perceived lane element that defines the perceived lane to attempt to match the mapped lane with the perceived lane;
in response to detecting the discrepancy, and while maintaining the on-board map data unaltered in the on-board map, augmenting the baseline map data to generate augmented map data, wherein the augmented map data describes a pathway for use in operating the autonomous vehicle in the perceived lane defined by the at least one perceived lane element;
providing the augmented map data to a motion planner component to generate a trajectory for the autonomous vehicle using the augmented map data; and
controlling the autonomous vehicle using the trajectory generated by the motion planner component using the augmented map data.

20. A non-transitory computer readable storage medium storing computer instructions executable by one or more processors to perform a method of operating an autonomous vehicle, the method comprising:
receiving baseline map data determined from on-board map data stored in an on-board map that describes a mapped lane on a roadway in an environment within which the autonomous vehicle operates;
receiving perception data describing at least one perceived lane element for the roadway that is based on sensor data sensed by at least one perception sensor of the autonomous vehicle during operation of the autonomous vehicle on the roadway;
detecting a discrepancy between the mapped lane described by the baseline map data and a perceived lane on the roadway that is defined by the at least one perceived lane element, wherein the discrepancy is detected by comparing at least one mapped lane element that represents the mapped lane with the at least one perceived lane element that defines the perceived lane to attempt to match the mapped lane with the perceived lane;
in response to detecting the discrepancy, and while maintaining the on-board map data unaltered in the on-board map, augmenting the baseline map data to generate augmented map data, wherein the augmented map data describes a pathway for use in operating the autonomous vehicle in the perceived lane defined by the at least one perceived lane element;
providing the augmented map data to a motion planner component to generate a trajectory for the autonomous vehicle using the augmented map data; and
controlling the autonomous vehicle using the trajectory generated by the motion planner component using the augmented map data.

* * * * *